United States Patent
Sarrigeorgidis et al.

(10) Patent No.: US 8,199,841 B1
(45) Date of Patent: Jun. 12, 2012

(54) CHANNEL TRACKING IN A WIRELESS MULTIPLE-INPUT MULTIPLE-OUTPUT (MIMO) COMMUNICATION SYSTEM

(75) Inventors: Konstantinos Sarrigeorgidis, Sunnyvale, CA (US); Kedar Shirali, San Jose, CA (US)

(73) Assignee: Marvell International Ltd., Hamilton (BM)

(*) Notice: Subject to any disclaimer, the term of this patent is extended or adjusted under 35 U.S.C. 154(b) by 905 days.

(21) Appl. No.: 12/111,129

(22) Filed: Apr. 28, 2008

Related U.S. Application Data

(60) Provisional application No. 60/914,163, filed on Apr. 26, 2007.

(51) Int. Cl.
*H04B 7/02* (2006.01)

(52) U.S. Cl. ........ 375/267; 375/299; 375/347; 455/101; 455/132

(58) Field of Classification Search .......... 375/267, 375/299, 347; 455/101, 132
See application file for complete search history.

(56) References Cited

U.S. PATENT DOCUMENTS

| | | | |
|---|---|---|---|
| 6,760,388 B2 | 7/2004 | Ketchum et al. | |
| 6,834,109 B1* | 12/2004 | Pare et al. | 379/416 |
| 7,065,146 B1 | 6/2006 | Lou et al. | |
| 7,333,540 B2* | 2/2008 | Yee | 375/232 |
| 7,336,727 B2 | 2/2008 | Mukkavilli et al. | |
| 7,397,758 B1* | 7/2008 | Hart et al. | 370/208 |
| 7,433,402 B2* | 10/2008 | Al-Dhahir et al. | 375/233 |
| 7,616,695 B1* | 11/2009 | Sarrigeorgidis | 375/260 |
| 7,639,759 B2* | 12/2009 | Chen | 375/329 |
| 7,912,140 B2* | 3/2011 | Anholt et al. | 375/262 |
| 2002/0186762 A1* | 12/2002 | Xia et al. | 375/232 |
| 2003/0108117 A1 | 6/2003 | Ketchum et al. | |
| 2004/0165684 A1 | 8/2004 | Ketchum et al. | |
| 2005/0041763 A1* | 2/2005 | Wang et al. | 375/350 |
| 2005/0047515 A1 | 3/2005 | Walton et al. | |
| 2006/0045193 A1 | 3/2006 | Stolpman et al. | |
| 2006/0239366 A1 | 10/2006 | Kim et al. | |
| 2006/0270352 A1 | 11/2006 | Webster et al. | |
| 2006/0274849 A1* | 12/2006 | Ketchum et al. | 375/267 |
| 2007/0165737 A1* | 7/2007 | Sarrigeorgidis | 375/267 |
| 2007/0206626 A1 | 9/2007 | Lee et al. | |
| 2007/0226287 A1 | 9/2007 | Lin et al. | |
| 2007/0258536 A1 | 11/2007 | Kim et al. | |
| 2008/0014870 A1 | 1/2008 | Kim | |
| 2008/0165875 A1 | 7/2008 | Mundarath et al. | |
| 2008/0266176 A1 | 10/2008 | Nabar et al. | |

(Continued)

FOREIGN PATENT DOCUMENTS

WO   WO 2007/037716 A1   4/2007

(Continued)

OTHER PUBLICATIONS

S. A. Mujtaba, "IEEE P802.11—Wireless LANS, TGn Sync Proposal Technical Specification", doc.: IEEE 802.11—04/0889r6, May 2005.

(Continued)

*Primary Examiner* — Juan A Torres

(57) ABSTRACT

An equalizer to be applied to signals received via at least one multiple input, multiple output (MIMO) channel is computed using a matrix equalizer computational device. The computed equalizer is applied to a received signal to recover an equalized representation of encoded data sent in a transmission. Errors are removed from the equalized representation of the encoded data to generate an error-corrected estimation of the encoded data sent in the transmission, and the equalized representation of the encoded data is compared to the error-corrected estimation of the encoded data. An updated equalizer is then computed to be applied to a subsequent signal based on the comparison.

27 Claims, 14 Drawing Sheets

U.S. PATENT DOCUMENTS

2009/0310656 A1 * 12/2009 Maltsev et al. ............ 375/219

FOREIGN PATENT DOCUMENTS

WO     WO 2007035993 A1 * 4/2007

OTHER PUBLICATIONS

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ, IEEE Std. 802.16a 2003, Apr. 1, 2003.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-speed Physical Layer in the 5 GHZ Band," IEEE Std. 802.11a, 1999.

"Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher-Speed Physical Layer Extension in the 2.4 GHz Band," IEEE Std. 802.11g/D2.8, May 2002.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," IEEE Std. 802.11 b, 1999.

U.S. Appl. No. 11/598,563, filed Nov. 13, 2006, Nabar et al.
U.S. Appl. No. 12/059,846, filed Mar. 31, 2008, Zhang et al.
U.S. Appl. No. 12/098,222, filed Apr. 4, 2008, Zhang et al.

"Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, " IEEE Std. 802.11g/D8.2, Apr. 2003.

International Standard, ISO/IEC 8802-11, ANSI/IEEE Std 802.11, "Information technology-Telecommunications and information exchange between systems-local and metropolitan area networks-specific requirements" Part 11: Wireless LAN Medium Access Control (MAC) and Physical Layer (PHY) specifications, *The Institute of Electrical and Electronics Engineers, Inc.*, (1999).

Non-Final Office Action mailed Aug. 9, 2011 (U.S. Appl. No. 12/098,222).

Non-Final Office Action mailed May 26, 2010 (U.S. Appl. No. 11/598,563).

Final Office Action mailed Nov. 17, 2010 (U.S. Appl. No. 11/598,563).

IEEE Std 802.11b-2001 (Corrigendum to IEEE Std 802.11b-1999) "IEEE Standard for Information technology-Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE P802.11n™/D3.00, Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

* cited by examiner

CHANNEL TRACKING IN A WIRELESS MULTIPLE-INPUT MULTIPLE-OUTPUT (MIMO) COMMUNICATION SYSTEM

RELATED APPLICATION

This is a regular-filed application which is based on and claims priority to U.S. Provisional Patent Application Ser. No. 60/914,163, entitled "Channel Tracking for 11n-Architectural Implementations," which was filed on Apr. 26, 2007, the entire disclosure of which is hereby incorporated by reference herein.

FIELD OF THE TECHNOLOGY

The disclosure relates generally to wireless communication systems and, more particularly, to a system and method for the simultaneous transmission of multiple streams of information or data in a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technologies are described in detail in the 802.11 IEEE Standards, including for example, the IEEE Standard 802.11a (1999) and its updates and amendments, the IEEE Standard 802.11g (2003), and the IEEE Standard 802.11n that is now in the process of being adopted, all of which are collectively incorporated herein fully by reference. These standards have been or are in the process of being commercialized with the promise of 54 Mbps or more effective throughput, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF down-conversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Thereafter, the baseband processor performs demodulation and frequency domain equalization (FEQ) to recover the transmitted symbols, and these symbols are then processed with an appropriate Forward Error Correction (FEC) decoder, e.g. a Viterbi decoder, to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to pre-condition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency, throughput and link reliability, and these benefits generally increase as the number of transmission and receive antennas within the MIMO system increases.

In particular, in addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

In addition, the MIMO channel formed by the various transmission and receive antennas between a transmitter and a receiver, also referred to as the channel matrix, is known to affect signals sent by the transmitter in a transmission. As such the receiver estimates the channel at the beginning of the transmission, for example by estimating the channel in the first symbol or two of a data transmission packet using high throughput, long training fields (HT-LTF) when using the IEEE 802.11n standard. The receiver then applies the an inverse of the channel matrix estimate to the remainder of the transmission (e.g., for all remaining symbols in a data transmission packet) in order to compensate for the effects of the channel and recover the original vectors (e.g., the original symbols). However, channel estimation errors may result in errors in the recovered vectors. Likewise, changes in the channel matrix over the duration of the data transmission may also result in errors in the recovered vectors, because the channel estimate is no longer an accurate estimate of the actual channel. As a result, channel estimation in a MIMO system, or other wireless system that estimates the transmission channel, is not always accurate through the duration of the transmission.

SUMMARY

In one embodiment, a method of channel tracking within a communication system having a first transceiver device having a plurality of transmission antennas and a second transceiver device having a plurality of receiving antennas is disclosed. The method includes computing an equalizer to be applied to signals received via at least one multiple input, multiple output (MIMO) channel using a matrix equalizer computational device when the matrix equalizer computational device is not needed for matrix equalization. The equalizer is initialized to the inverse of a channel estimation matrix. The method further includes applying the equalizer to a received signal to recover an equalized representation of encoded data sent in a transmission from the first transceiver device to the second transceiver device, removing errors from the equalized representation of the encoded data to generate an error-corrected estimation of the encoded data sent in the transmission, comparing the equalized representation of the encoded data to the error-corrected estimation of the encoded data, and computing an updated equalizer to be applied to a subsequent signal.

In another embodiment, an apparatus is disclosed, which includes a matrix equalizer, a decoder operatively coupled to an output of the matrix equalizer, an encoder operatively coupled to an output of the decoder, and matrix equalizer update logic operatively coupled to an output of the encoder and to an output of the matrix equalizer. The decoder decodes an equalized data vector from the matrix equalizer to remove errors from the equalized data vector. The encoder re-encodes the error-corrected equalized data vector to generate an error corrected estimation of the data vector. The matrix equalizer update logic generates an update for an equalization matrix for the matrix equalizer.

In a further embodiment, a wireless transceiver for transmitting an information signal to a plurality of receiver antennas associated with one or more receivers and for receiving an information signal from a plurality of transmission antennas is disclosed. The wireless transceiver includes a plurality of antennas, a QR decomposition processor, matrix equalization logic, a viterbi decoder, an encoder and matrix equalizer update logic. The QR decomposition processor has a Q memory, an R memory, and one or more coordinate rotation digital calculation (CORDIC) engines each having a plurality of CORDIC calculators. The QR decomposition processor is configured to decompose an estimate of the channel into an orthogonal matrix Q and an upper triangular matrix R. The matrix equalization logic applies a matrix equalizer to a data vector received in a data packet to generate an equalized data vector. The matrix equalizer is based on a plurality of rotation angles representing the conjugate transpose of the orthogonal matrix Q and based on the inverse of the upper triangular matrix R. The matrix equalization logic is configured to merge the rotation angles and the upper triangular matrix R in a plurality of steps to generate the matrix equalizer, each step being executed during an unused time period in one or more of the CORDIC engines. The viterbi decoder decodes the equalized data vector to remove errors from the equalized data vector, and the encoder re-encodes the error-corrected equalized data vector to generate an error corrected estimation of the data vector. The matrix equalizer update logic generates an update to the matrix equalizer based on a difference between the error corrected estimation of the data vector and the equalized data vector.

DETAILED DESCRIPTION

While the transmission techniques described herein for processing and effecting a wireless data transmission are described as being used in communication systems that use one of the IEEE Standard 802.11(x) communication standards, these techniques may be used in various other types of wireless communication systems and are not limited to those conforming to one or more of the IEEE Standard 802.11(x) standards.

Figure 1:
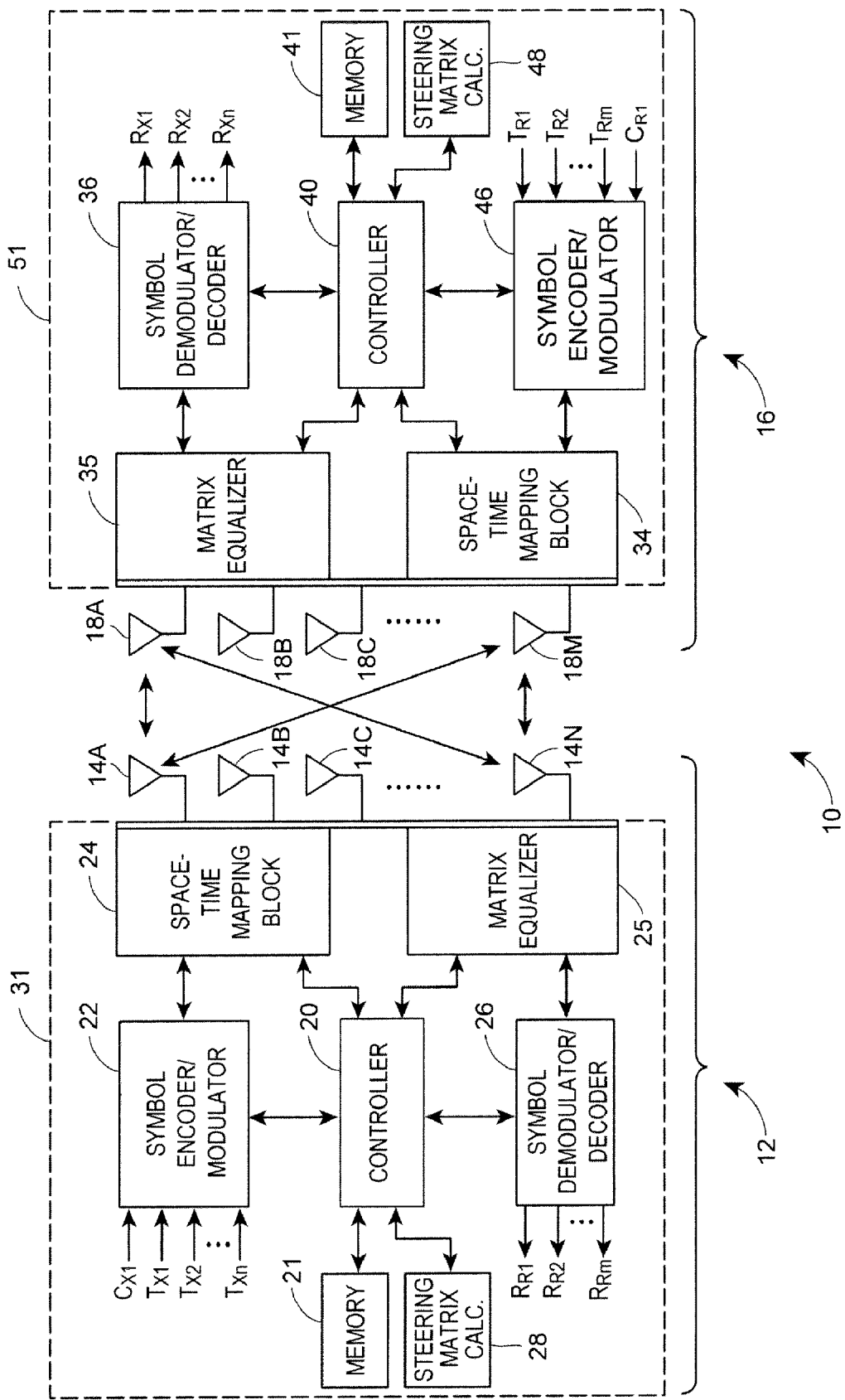
FIG. 1 is a block diagram of a wireless MIMO communication system that determines and uses a spatial spreading matrix to provide for equal power output at all of the transmission antennas of a transmitter.

Referring now to FIG. 1, a MIMO communication system 10 is illustrated in block diagram form as generally including a single transmitter 12 having multiple transmission antennas (or antenna elements) 14A-14N and a single receiver 16 having multiple receiver antennas (or antenna elements) 18A-18M. The number of transmission antennas 14A-14N can be the same as, more than, or less than the number of receiver antennas 18A-18M. As shown in FIG. 1, the transmitter 12 may include a controller 20 coupled to a memory 21, to a symbol encoder and modulator unit 22 and to a spatial spreading block 24. The transmitter 12 may also include a matrix equalizer 25 and a symbol demodulator and decoder unit 26 to perform demodulation and decoding of signals received via the antennas 14A-14N in a receive mode. Additionally, in some instances, the transmitter 12 may include a spreading matrix calculation unit 28.

The controller 20 may be any desired type of controller and the controller 20 and the spreading matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the spatial spreading block 24, and the matrix equalizer 25 may be implemented using known or standard hardware and/or software elements. If desired, various of the transmitter components, such as the controller 20, the modulator unit 22, the demodulator unit 26, the spreading matrix calculation unit 28, the spatial spreading block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

Likewise, if desired, one or more pre-calculated or predetermined spatial spreading matrices may be stored in the memory 21 and used in the spatial spreading matrix block 24 at various times or under various different conditions. Thus, for example, a different pre-calculated or predetermined spatial spreading matrix may be stored for each of a number of possible combinations of encoded spatial streams of data to be transmitted and transmission antennas 14A-14N to be used to simultaneously transmit these encoded spatial streams of data. Thus, for example, a different spatial spreading matrix may be calculated and stored for two spatial streams of data being sent via three of the transmission antennas 14A-14N, for two spatial streams of data being sent via four of the transmission antennas 14A-14N, for three spatial streams of data being sent via five transmission antennas 14A-14N, etc. In this manner, the communication system 10 may optimally send different numbers of spatial streams of data at different times, depending on the load of the system. Moreover, the communication system 10 may also use these various different pre-stored or pre-calculated spatial spreading matrices to account for or to adapt to the loss of one or more of the transmission antennas 14A-14N to be used in sending data within the communication system 10.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more encoded streams of symbols $SS_1$, $SS_2$, . . . $SS_p$, to be modulated and sent from the transmitter 12 to the receiver 16. While the symbol streams $SS_1$-$SS_p$ may be modulated using any desired or suitable QAM technique, such as using 64 QAM, these symbols may be modulated in any other known or desired manner including, for example, using any other desired phase and/or frequency modulation techniques. In any event, the modulated encoded symbol streams $SS_1$-$SS_p$ are provided by the symbol encoder and modulator unit 22 to the spatial spreading block 24 for processing before being transmitted via the antennas 14A-14N. While not specifically shown in FIG. 1, the modulated symbol streams $SS_1$-$SS_p$ may be processed by the spatial spreading block 24 that implements a spatial spreading matrix in accordance with a transmission technique more specifically described below, before being up-converted to the RF carrier frequencies associated with an OFDM technique (in one or more stages). Upon receiving the modulated signals, the spatial spreading block 24 processes the modulated signals by injecting delays and/or gains into the modulated signals based on a spatial spreading matrix which may be provided by, for example, the controller 12, to thereby perform mixing and transmission of the spatial streams of data across the transmission antennas 14A-14N.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings $SS_1$-$SS_p$ as recovered by the matrix equalizer 35. In this process, these signals may be downconverted to baseband. Generally, the demodulator and decoder unit 36 may operate to remove effects of the forward channel based on the CSI as well as to perform demodulation on the received symbols in each symbol stream $SS_1$-$SS_p$ to produce a digital bit stream for each stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a spatial spreading block 34 which may use a spatial spreading matrix developed according to the principles described herein based on the number of symbol streams to be sent simultaneously and the number of transmission antennas 18A-18N to be used. The output of the spatial spreading block 34 is then transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the symbol streams transmitted by the receiver 16 to produce the recovered signals $R_{R1}$-$R_{Rm}$. Here again, the matrix equalizer 25 may process the received signals in any known manner to enhance the separation and therefore the reception of the various symbol streams transmitted by the antennas 18A-18M. Of course, the CSI or other measured description of the forward channel for the various OFDM channel(s) may be used to process or decode the received signals.

As is generally known, when the transmitter 12 sends multiple data streams by multiple transmission antennas 14A-14N, or a subset thereof, to multiple receiver antennas 18A-18M, or a subset thereof, of the receiver 16, the data streams are transmitted through a channel matrix, H, which includes the multiple paths between the transmission antennas 14A-14N and the receive antennas 18A-18M. The receiver 16 obtains the signal vectors from the transmission and decodes the signal vectors into the information of interest. As discussed above, in the case of OFDM, the receiver 16 processes OFDM encoded data symbols that include the information of interest. In either case, the receiver 16 uses an estimate of the channel matrix, $\hat{H}$, to resolve each data vector from the data transmission.

The channel matrix estimation, $\hat{H}$, is generated from sounding data transmitted from the transmitter 12. In particular, and as discussed below, the transmitter 12 may utilize high throughput, long training fields (HT-LTF), which are periodically generated and transmitted from the transmitter 12 to the receiver 16. Each HT-LTF includes a plurality of training symbols, which are used by the receiver 16 to generate the channel matrix estimation, $\hat{H}$. Generally, the channel matrix estimation is generated at the beginning of a data transmission, such as the beginning of the transmission of a data packet, and reset for subsequent transmissions (e.g., reset for each subsequent data packet). Although HT-LTF generally relates to the IEEE Standard 802.11n standard, it should be understood that other channel estimation preambles or channel estimation training patterns may be utilized in the matrix equalizer reuse techniques described herein, depending on the particular technology involved (e.g., WiMax, DVB-T, DAB, LTE, etc.)

The channel matrix, H, affects the data vectors, $y_n$, sent in the data transmission, such that the receiver 16 must account for the channel matrix when receiving the data vectors, $y_n$. As such, the channel matrix estimation, $\hat{H}$, is used by the receiver 16 to resolve each of the data vectors in the data transmission. For example, in the case of OFDM, the receiver 16 uses the channel matrix estimation, $\hat{H}$, generated at the beginning of a data packet for all symbols within the transmission. More particularly, the receiver 16 applies the inverse of the channel matrix estimation, $\hat{H}$, denoted as $H^{-1}$ or W (also referred to as the equalization matrix or equalizer) to account for and equalize the effects of the channel matrix, H. The equalization matrix, W, is applied to each data vector, $y_n$, received in the data transmission in order to generate a representation of the transmitted data, such as the transmitted symbols in the case of OFDM. The representation of the transmitted data is also referred to as the equalized vector, $\hat{x}_n$.

However, the representation of the data, $\hat{x}_n$, may contain errors due to errors in the channel matrix estimation, $\hat{H}$, or due to changes in the channel matrix, H. In the latter instance, the channel matrix, H, may slowly change over the duration of the data transmission. In the case of long data transmissions, such as large data packets, the channel estimation matrix, $\hat{H}$, generated at the beginning of the data transmission and the corresponding equalization matrix, W, are not accurate for all data vectors or symbols within the data packet. Generally, in typical 802.11(x) transmission, the data packet duration is relatively short, unless small data packets are aggregated to form a much larger data packet. As described herein, the channel matrix estimation, $\hat{H}$, and, more particularly the equalization matrix, W, may be initialized using the initial channel matrix estimation, $\hat{H}$, and refined for each data vector, $y_n$, or symbol received in a data transmission in order to accurately derive the information of interest.

Development of the equalization matrix, W, can be computationally expensive. In particular, determining the inverse of the channel matrix estimation, $H^{-1}$, can be computationally expensive, particularly when the channel matrix estimation is not square. When calculating the equalization matrix, W, it is optimal to develop the equalization matrix, W, using various known computational techniques. Such an equalization matrix, W, generally accounts for changes to the received data vector, $y_n$, by removing the channel matrix, H, and equalizing the data vector, $y_n$. However, as the size of the number of receiver and transmitter antennas increases, the size and configuration of the channel matrix, H, becomes larger and more complex, and the number of calculations that need to be performed to develop the optimal equalization matrix, W, increases significantly (e.g., exponentially).

To increase efficiency and to reduce the computational load associated with determining the equalization matrix, W, the system of FIG. 1 may develop an equalization matrix, W, using information and/or hardware or software used in either the receiver 16 or the transmitter 12 as part of the matrix equalizer functionality which ultimately reduces the computational load associated with inverting the channel estimation matrix, $\hat{H}$. For example, the transmitter 12 (or the receiver 16) may develop the equalization matrix, W, by using the computational structure of the matrix equalizer to perform equalization matrix calculation.

Here, it is useful to note that the matrix equalizer (of the receiver 16 for example) acts on the estimate of the channel, $\hat{H}$, to determine matrix coefficients that help equalize (separate) the (multiple) transmitted signals. A matrix equalizer is an essential component of any MIMO communication system, and is needed for a receiver to recover the transmitted signals. Thus, the computational mechanisms used to perform matrix equalization are needed within the receiver hardware components of a MIMO communication system. However, equalization matrix calculation is an optional technique, and thus any structure added to perform equalization matrix calculation adds to the cost and computational load of the hardware/software components of the MIMO communication system. However, because both matrix equalization (i.e., the use of an equalization matrix) and the calculation of the equalization matrices are essentially matrix operations, some of the computing structure provided to implement matrix equalization may be used to implement or perform matrix equalization or equalization matrix calculation operations, thereby enabling both of these operations to be performed using common hardware/software or other computational mechanisms. For example, the matrix equalizer often uses a QR decomposition algorithm to determine the equalizer coefficients, and this QR decomposition algorithm may be reused to perform equalization matrix computations.

Thus, based on the discussion provided above, it is possible to use the computational structure of a matrix equalizer within a MIMO communication system to perform at least some aspects of the equalization matrix calculation operations. In this case, the equalization matrix calculation using matrix equalizer structure can be performed in a receiver or of the transmitter/receiver pair in which equalization matrix calculation is to be used in equalizing signal vectors from the transmitter to the receiver of the transmitter/receiver pair. In one case, the steering matrix calculation unit 28 or 48 may use some of the computational structure of the associated matrix equalizer 25 or 35 to compute an equalization matrix. In the case in which the matrix equalizer 35 of the receiver 16 is used to perform equalization matrix calculation within the transmitter 12, the processing using the matrix equalizer 35 is performed in the receiver 16 to develop the equalization matrix, which may be sent to the transmitter 12. Of course, in this case, it will be understood that the equalization matrix computations made using the structure or algorithms of the matrix equalizer 25 may produce coefficients or other information not related in any way to the coefficients required for equalization of a transmitted signal.

In any event, as discussed above, the matrix equalizer 35 (of the receiver 16) or may be used to perform equalization matrix calculation for performing matrix equalization of signals sent from the transmitter 12 to the receiver 16. If the matrix equalizer 35 of the receiver 16 is used to perform these calculations, the equalization matrix update unit (described further below) may, for example, use the equalization matrix developed using the matrix equalizer 35 to develop appropriate adjustments to the equalization matrix needed for accounting for errors and/or changes in the channel matrix. The equalization matrix update unit may then send these updates, or send updated equalization matrices, to the matrix equalizer for use in equalizing subsequent data vectors in the data transmission. The equalization matrix update unit may, of course reuse as much of the components and structure of the matrix equalizer 35 as possible or desired in computing the equalization matrix for use by the receiver 16.

Using information pertaining to a matrix equalizer in a receiver to determine the equalization matrix used by a receiver to perform matrix equalization in the transmission of a signal to the receiver may reduce the circuitry and/or software for forming the equalization matrix, may reduce the complexity of the hardware and/or the software used to implement the receiver 16 and may also increase the accuracy and efficiency at which the receiver 16 is able to receive information or adapt to new channel conditions based on the receipt of new or updated equalization matrices.

In addition to complexities in determining the equalization matrix, W, errors in the equalized vectors, $\hat{x}_n$, have also been shown to increase when the number of signal streams, $N_{SS}$ is larger than one. In particular, this is due to high QAM symbol errors, particularly in the presence of multipath and moderate to low SNR. For example, using the QAM technique, the matrix equalizer (of the receiver 16 for example) slices the input from a Fast-Fourier Transform block to obtain the symbol from the transmission and outputs a hard decision regarding the constellation point in the QAM technique. However, those decisions are not always reliable, because they depend on the conditions of the channel (e.g., SNR), and channel conditions affect the constellation points. Therefore, it should be assumed that the decisions from the matrix equalizer are not always correct. In the channel estimation refinement technique described herein, updates to the equalization matrix, W, are based on training date from data vectors, $y_n$, received by the receiver 16, but equalized vectors, $\hat{x}_n$, output from the equalization matrix are erroneous being based on the data vectors, $y_n$, then the errors are propagated to the training data and further propagated to the updates to the equalization matrix, W.

Figure 2:
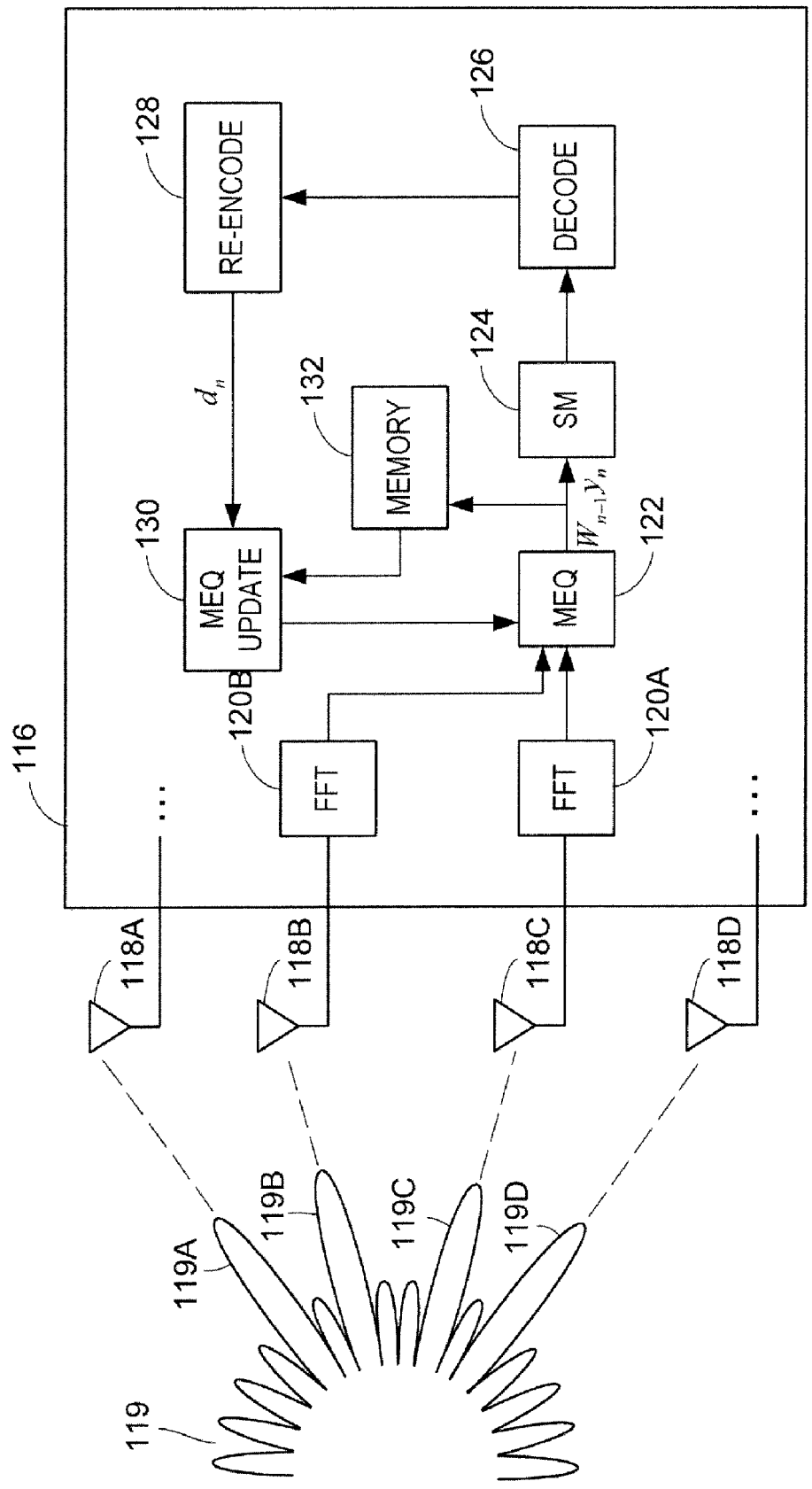
FIG. 2 is a block diagram illustrating a transceiver using an equalization matrix updating technique that incorporates the use of receiver matrix equalizer information.

To illustrate the estimation matrix update technique described herein, FIG. 2 shows an example of a MIMO transceiver 116 having four receiver antennas 118A-118D to receive a transmit gain pattern 119 transmitted from a transmitter (not shown), where the transmit gain pattern 119 transmits the data streams of the data vectors containing OFDM encoded symbols or other information of interest to the transceiver 116. As shown in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates particular transmit gain pattern, it will be understood that the actual gain pattern may not necessarily include a separate high gain lobe for each of the receiver antennas 118A-118D, and may take a variety of forms, the disclosure of which is not necessary for an understanding of the estimation matrix update technique.

The transceiver 116 includes Fast Fourier Transform (FFT) blocks 120A, 120B, where an FFT may be provided for each receiving antenna 118A, 118B. Alternatively, two or more of the receiving antennas 118A-118D may be coupled to the same FFT block. The received data streams may be received from the Fast Fourier Transform (FFT) blocks 120A, 120B, directly or indirectly. In any case, the output from the FFT blocks 120A, 120B are provided to a matrix equalizer computational block (MEQ) 122, an example of which is described in further detail below. In one example using the QAM technique, the matrix equalizer computational block 122 acts as a QAM slicer that "slices" the input from the FFT block(s) 120A, 120B to obtain the nearest data vector (or symbol in the case of OFDM) in the received data transmission, and outputs hard decisions to obtain the nearest constellation point. Having obtained a data vector, $y_n$, or symbol from the transmission, the data vector $y_n$ is still affected by the channel matrix, H. Therefore, the MEQ 122 applies the equalization matrix, $W_{n-1}$, which is generally an inverse of the channel matrix, H, to the data vector, $y_n$, in order to equalize and recover the data vector, $y_n$, where n refers to the time index or symbol time of the received data vector. As will be understood from the description below, the equalization matrix, $W_{n-1}$, is initially computed using the inverse of the channel estimation matrix, $\hat{H}$, and updated based on received data vectors, $y_n$, and applied to subsequent data vectors, $y_{n+1}$. As a result, the time index of the equalization matrix $W_{n-1}$, generally lags the data vector to which it is applied, such that the equalization matrix, $W_{n-1}$, is the inverse of the channel matrix, H, for the previous vector, $y_{n-1}$. However, it is contemplated that once the initial equalization matrix is computed based on the channel estimation matrix $\hat{H}$, as described below, the equalization matrix, $W_{n-1}$, may be updated for every data vector, $y_n$, or symbol within the transmission, thereby tracking changes in the channel matrix, H, and providing periodic, regular updates to the equalization matrix $W_{n-1}$ in response thereto over the duration of the transmission.

The output from the MEQ 122 is the equalized vector, $\hat{x}_n$, of the data vector, $y_n$. In other words, the equalized vector, $\hat{x}_n$, is an equalized representation of encoded data sent in the data transmission. The equalized vector, $\hat{x}_n$, may thereby be represented according to the following equation:

$$\hat{x} = W_{n-1} y_n \qquad (\text{Equ. 1})$$

The equalized vector is applied to a soft metric block 124 and then applied to a decoder 126. In one example, the decoder 126 is a Viterbi decoder that implements spatial de-parsing, de-interleaving and depuncturing of the encoded equalized vector, $\hat{x}_n$. Generally speaking, the Viterbi decoder 126 uses the Viterbi algorithm for decoding data vectors that have been encoded using forward error correction (FEQ), and is useful for recovering errors from the MEQ block 122 output and removing errors from the vector to make the decoded vector more reliable. As discussed above, errors in the equalized vectors, $\hat{x}_n$, increase when the number of signal streams, $N_{SS}$ is larger than one due to high QAM symbol errors resulting from channel conditions, such that the decisions from the MEQ block are not always reliable. In order to account for these errors, the Viterbi decoder is chosen as being particularly useful for maximum likelihood decoding; that is, decoding the encoded equalized vector, $\hat{x}_n$, removes the errors from the data to determine the best estimation of the encoded data.

Having decoded the equalized vector, $\hat{x}_n$, the data is re-encoded and re-modulated at a re-encoder 128. The output from the re-encoder, $d_n$, is then an error-corrected version of the encoded equalized vector, $\hat{x}_n$, or, to put it otherwise, a best estimation of the data that was sent from the transmitter. The re-encoded data, $d_n$, is then provided to a equalization matrix (MEQ) update unit 130, which uses the re-encoded data, $d_n$, as training data for determining changes in the channel matrix. In particular, the MEQ update unit 130 compares the re-encoded data, $d_n$, which is a vector, to the equalized representation of the data vector, $\hat{x}_n$. As seen in FIG. 2, a memory 132 is provided which stores the output from the MEQ block 122; namely the equalized representation of the data vector, $\hat{x}_n$, which is then accessible by the MEQ update unit 130.

Because the equalized representation of the data vector, $\hat{x}_n$, is assumed to be error-prone versus the re-encoded data, $d_n$, which is generally assumed to be error-free or at least have minimal errors, the MEQ update unit 130 is able to track the changes in the matrix by comparing data affected by the channel matrix to data unaffected by the channel matrix thereby monitoring changes in the channel matrix and adapting the equalization matrix, $W_{n-1}$, to those changes. For example, as described further below, the MEQ update unit 130 may generate an error vector based on the comparison of the equalized representation of the data vector, $\hat{x}_n$, and the re-encoded data, $d_n$. Using the error vector, the MEQ update unit 130 may further utilize update or adaptation rules, such as least-mean-squares or recursive-least-squares, to generate an update to the equalization matrix or to generate an entirely new equalization matrix, $W^n$ to be applied to subsequent data vectors, $y_{n+1}$, received in the data transmission.

By using the re-encoded data, $d_n$, for each data vector, it can be seen that the above channel tracking and equalization matrix updating technique is an adaptive technique that is directed by the decisions of the MEQ block 122. However, it should also be understood that the above scheme may be applied to update the channel estimate and compute an updated equalization matrix. However, this latter approach is generally suited for spatial rates of one (i.e., one spatial streams), whereas the above-described technique to update the equalization matrix itself is suitable for both spatial rates of one and spatial greater than one (i.e., two or more spatial streams). Further, it should be understood that the decisions to track the channel matrix and update the equalization matrix can be based solely on the MEQ block 122 output. However, this approach assumes that the data vectors has been only minimally affected by the channel matrix conditions.

As such, the MEQ update unit 130 may update the equalization matrix in a variety of manners. In one example, the MEQ update unit 130 may directly update the equalization matrix using LMS adaptation, RMS adaptation, or QR decomposition RMS (QRD-RMS), each approach having respectively higher degrees of complexity and, as a result, higher computational cost. In another example, the MEQ update unit 130 may update the channel estimation matrix, $\hat{H}$, using LMS adaptation, RMS adaptation or an algorithm to compute an error channel estimation matrix, $\Delta \hat{H}$. As a consequence of updating or determining a new channel estimation matrix, $\hat{H}$, the equalization matrix would be computed as the inverse (or pseudo-inverse) of the channel estimation matrix. In yet another example, the MEQ update unit 130 may compute the error equalization matrix, $\Delta W$, using LMS or RLS, or by updating $Q^*$, $R^{-1}$ based on a QR rank one update, again each having respectively increasing complexity and computation cost.

Figure 3A:
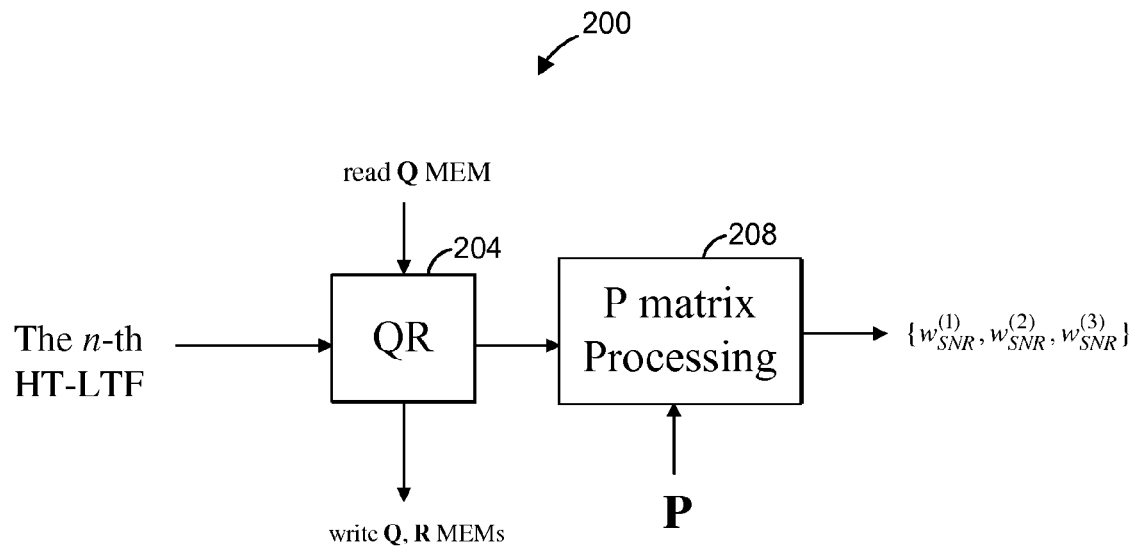
FIG. 3A is a block diagram of an example matrix equalizer computational block.

Referring now to FIG. 3A, an example matrix equalizer computational block 200 will now be described. The block 200 may be included in the matrix equalizer 35 of FIG. 1 and the MEQ block 122 of FIG. 2, for example. As will be described subsequently, the block 200 may be reused for calculations related to equalization matrix computation.

In FIG. 3A, the block 200 is illustrated in the context of processing a high throughput, long training field (HT-LTF). In systems compliant with the IEEE 802.11n Standard, HT-LTFs are periodically generated and transmitted by a transmitter. Each HT-LTF includes a plurality of training symbols. At the transmitter, each training symbol is multiplied by a corresponding column of a preamble steering matrix P, wherein a number of rows of the matrix P corresponds to the number of spatial streams, and a number of columns of the matrix P corresponds to the number of HT-LTFs. Matrix P is configured to improve the orthogonality of the training symbols as they are transmitted from the antennas of the transmitter.

A receiver knows what training symbols were transmitted in the HT-LTFs and also knows the matrix P. After receiving all of the HT-LTFs, the receiver generates a channel matrix estimation $\hat{H}$ based on the known training symbols, the matrix P, and the received training symbols. The matrix can then be used to adjust matrix equalizer coefficients. The block 200 can be used by a receiver to process HT-LTFs for updating equalizer coefficients. Also, as will be described with reference to FIG. 4A, the block 200 can be used to apply an equalizer matrix to received data.

Figure 3B:
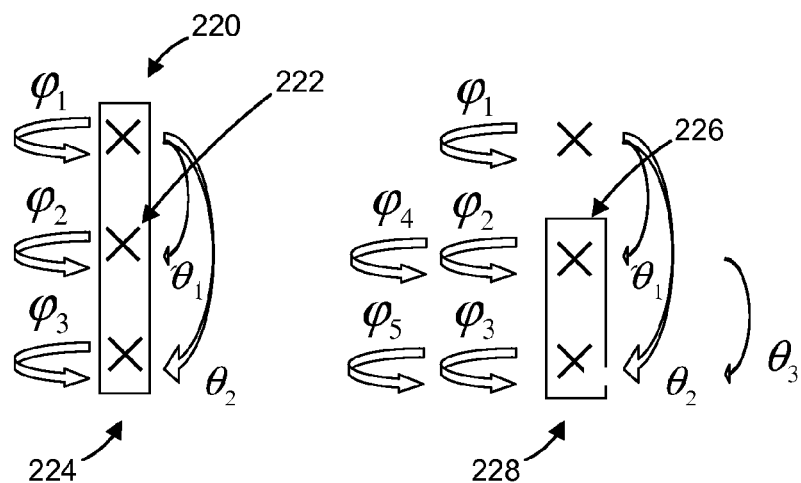
FIG. 3B is an illustration of an iterative algorithm for decomposing a 3×3 matrix into Q and R matrices.

The block 200 includes a QR decomposition processor 204, which is coupled to a Q memory and an R memory (not shown). Generally speaking, QR decomposition is a method in which a matrix is decomposed into a Q matrix multiplied by an R matrix, wherein the Q matrix is a unitary (orthonormal) 1 matrix (i.e., $Q^H Q = I$) (wherein the Hermitian operator$^H$ stands for transpose conjugate) and R is an upper triangular matrix. The QR decomposition processor 204 iteratively decomposes an input matrix. For example, the QR decomposition processor 204 may implement a Householder reflections algorithm, a Givens rotations algorithm, etc., to iteratively decompose an input matrix into Q and R matrices. In one embodiment, the QR decomposition processor 204 implements an algorithm that will be described with reference to FIG. 3B. In particular, FIG. 3B illustrates an iterative algorithm for decomposing a 3×2 matrix into Q and R matrices. One of ordinary skill in the art will recognize that the algorithm to be described with reference to FIG. 3B can be straightforwardly modified for use with decomposing other size matrices.

In FIG. 3B, the matrix to be decomposed is represented by a 3×2 array of X's. First, a matrix $Q_{\phi_1}$ is determined such that multiplying it by the original matrix will cause the complex element 220 to become a real number. This process may be considered as rotating the complex element 220 by an angle $\phi_1$. The matrix $Q_{\phi_1}$ may be stored in a Q memory, and the resultant matrix ($R_1$), i.e., the original matrix after element 220 has been rotated by $\phi_1$, may be stored in an R memory. Optionally, the angle $\phi_1$ may be stored in the Q memory, rather than the matrix $Q_{\phi_1}$. Optionally, the $R_1$ matrix may be kept in a temporary storage, rather than being stored in the R memory. Similarly, a matrix $Q_{\phi_2}$ is determined such that $Q_{\phi_2} R_1$ will cause the complex element 222 to become a real number. This process may be considered as rotating the complex element 222 by an angle $\phi_2$. The multiplication result $Q_{\phi_2} Q_{\phi_1}$ and may be stored in the Q memory such that $Q_{\phi_1}$ is overwritten, and the resultant matrix ($R_2$) is stored in the R memory such that $R_1$ is overwritten. Optionally, the angle $\phi_2$ may be stored in the Q memory, rather than the matrix $Q_{\phi_2} Q_{\phi_1}$. Optionally, the $R_2$ matrix may overwrite the $R_1$ matrix in temporary storage. Then, a matrix $Q_{\phi_3}$ is determined such that $Q_{\phi_3} R_2$ will cause the complex element 224 to become a real number. This process may be considered as rotating the complex element 224 by an angle $\phi_3$. The multiplication result $Q_{\phi_3} Q_{\phi_2} Q_{\phi_1}$ may be stored in the Q memory such that $Q_{100_2} Q_{\phi_1}$ is overwritten, and the resultant matrix ($R_3$) is stored in the R memory such that $R_2$ is overwritten. Optionally, the angle $\phi_3$ may be stored in the Q memory, rather than the matrix $Q_{\phi_3} Q_{\phi_2} Q_{\phi_1}$. Optionally, the $R_3$ matrix may overwrite the $R_2$ matrix in temporary storage.

Next, a matrix $Q_{\theta_1}$ is determined such that $Q_{\theta_1} R_3$ the vector including elements 220 and 222 is rotated by an angle $\theta_1$ that causes the element 222 to go to zero. The multiplication result $Q_{\theta_1} Q_{\phi_3} Q_{\phi_2} Q_{\phi_1}$ may be stored in the Q memory such that $Q_{\phi_3} Q_{\phi_2} Q_{\phi_1}$ is overwritten, and the resultant matrix ($R_4$) is stored in the R memory such that $R_3$ is overwritten. Optionally, the angle $\theta_1$ may be stored in the Q memory, rather than the matrix $Q_{\theta_1} Q_{\phi_3} Q_{\phi_2} Q_{\phi_1}$. Optionally, the $R_4$ matrix may overwrite the $R_3$ matrix in temporary storage. Similarly, a matrix $Q_{\theta_2}$ is determined such that $Q_{\theta_2} R_4$ the vector including elements 220 and 224 is rotated by an angle $\theta_2$ that causes the element 224 to go to zero. The multiplication result $Q_{\theta_2} Q_{\theta_1} Q_{\phi_3} Q_{\phi_2} Q_{\phi_1}$ may be stored in the Q memory such that $Q_{\theta_1} Q_{\phi_3} Q_{\phi_2} Q_{\phi_1}$ is overwritten, and the resultant matrix ($R_5$) is stored in the R memory such that $R_4$ is overwritten. Optionally, the angle $\theta_2$ may be stored in the Q memory, rather than the matrix $Q_{\theta_2} Q_{\theta_1} Q_{\phi_3} Q_{\phi_2} Q_{\phi_1}$. Optionally, the $R_5$ matrix may overwrite the $R_4$ matrix in temporary storage.

In subsequent iterations, the elements are rotated in the same manner as above. In addition, element 226 is rotated by an angle $\phi_4$ and element 228 is rotated by angle $\phi_5$. Then, the vector including elements 226 and 228 is rotated by an angle $\theta_3$ that causes the element 228 to go to zero. Finally, the Q memory may be updated and thus contains the Hermitian of the Q matrix (i.e., $Q^H$) corresponding to the QR decomposition and/or the angles $\phi_1$-$\phi_5$ and $\theta_1$-$\theta_3$. Also, the resultant matrix may be stored in the R memory and the R memory will thus contain the R matrix corresponding to the QR decomposition.

Referring again to FIG. 3A, the QR decomposition processor 204 may implement the algorithm described with reference to FIG. 3B. The QR decomposition processor 204 may receive a matrix corresponding to each tone corresponding to each HT-LTF received by the receiver. In particular, each matrix may include rows and columns that correspond to a number of training symbols received by a number of receiver antennas.

The QR decomposition processor 204 is coupled to a P matrix processing block 208 that generates a plurality of substream signal-to-noise (SNR) values ($W_{SNR}^{(1)}, W_{SNR}^{(2)}$), corresponding to the substream SNRs of the 1$^{st}$ and 2$^{nd}$ spatial streams respectively, based on the R matrix and the P matrix. Each of the substream SNR values may correspond to one of the spatial streams (in this example, there are two spatial streams transmitted in the 3×2 MIMO channel). The substream SNR values may be utilized for soft decoding at block 36 of FIG. 1, and/or for modulation and coding scheme (MCS) selection. As defined in the IEEE 802.11n specification, matrix P is configured as a real orthogonal matrix, for the purpose of orthogonality between the training symbols as they are transmitted from the antennas of the transmitter. With the P matrix applied, the un-processed CSI estimate corresponding to the k-th subcarrier of the MIMO-OFDM system, before feeding into the QR decomposition processor 204 of FIG. 3A, is an estimate of the matrix $H_{raw\_k} = H_k Q_{k,souding} P$. So the QR decomposition computation 204 basically computes the QR decomposition of the matrix $H_{raw\_k}$, and the P matrix processing block 208 adjusts the QR decomposition to account for the P matrix, thereby deriving the corrected Q and R matrices (as well as the substream-SNR values) of the true channel $H_k Q_{k,souding} = H_{raw\_k} P^{-1}$.

Figure 4A:
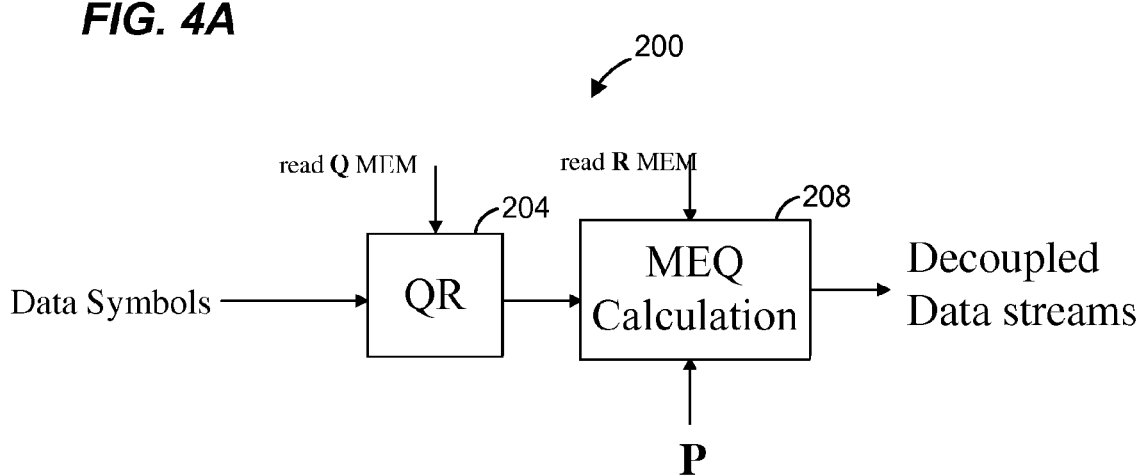
FIG. 4A is a block diagram of the example matrix equalizer computational block of FIG. 5A shown in a different context.
Figure 4B:
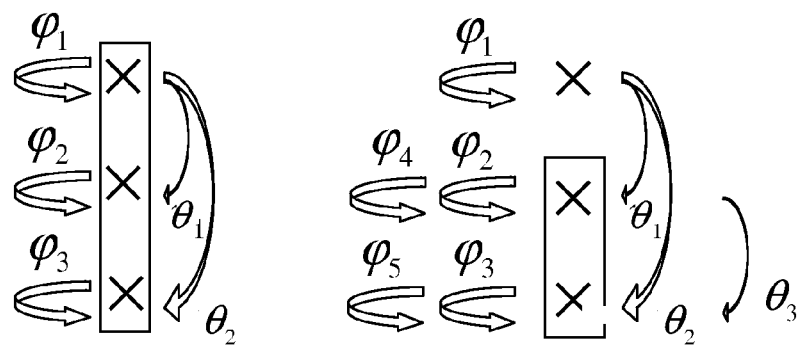
FIG. 4B is an illustration of an iterative algorithm for decomposing a 3×3 matrix into Q and R matrices.

After the HT-LTFs have been processed, the block 200 may also be utilized to apply matrix equalization to data symbols. FIG. 4A is a block diagram showing the block 200 in the context of processing data symbols. In particular, the QR decomposition processor 204 receives and process data symbols. The block 208 applies matrix equalization to the processed data symbols based on the R matrix and the P matrix. FIG. 4B illustrates that, when processing the data symbols, the QR decomposition processor 204 applies rotations that were stored in the Q memory component of the QR processing block of FIG. 3A, and the rotation process is similar to those discussed above with respect to FIG. 3B.

Figure 5:
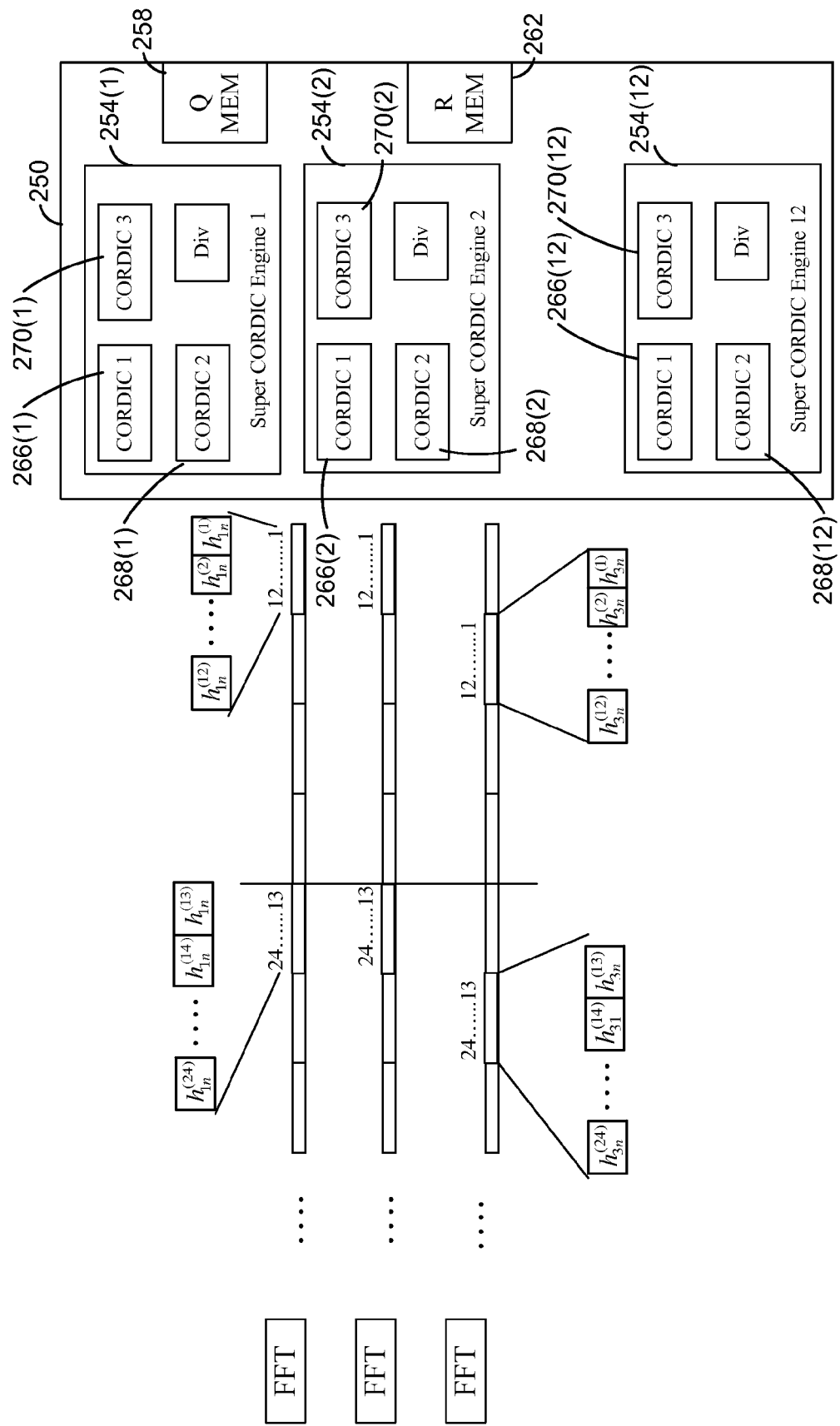
FIG. 5 is a block diagram of an example QR decomposition processor that may be utilized in a matrix equalizer such as the matrix equalizer of FIGS. 3A and 4A.

FIG. 5 is a block diagram illustrating one example QR decomposition processor 250 that may be utilized as the decomposition processor 204 of FIGS. 4A and 4B. The QR decomposition processor 250 includes twelve coordinate rotation digital calculation (CORDIC) engines 254 coupled to a Q memory 258 and an R memory 262. Although twelve CORDIC engines 254 are illustrated in FIG. 5, there may be more or less than twelve physical CORDIC engines 254. For example, in some implementations, a physical CORDIC engine 254 may be time-shared so that it acts as multiple "virtual" CORDIC engines 254. As another example, if operation in a 40 MHz mode is to be supported, there may be thirteen virtual or physical CORDIC engines 254. In the example of FIG. 5, each CORDIC engine 254 includes three CORDIC calculation blocks 266, 268, 270 (i.e., CORDIC calculators). In other implementations, each CORDIC engine 254 may include less than or more than three CORDIC calculation blocks. In addition, although the Q memory 258 and the R memory 262 are shown to be included in the block 250, it should be understood that the Q memory 258 and the R memory 262 may be external to the QR decomposition processor 250, which may include providing the Q memory 258 and the R memory 262 on the same chip as the QR decomposition processor 250.

In the example of FIG. 5, the QR decomposition processor 250 receives two data streams corresponding to three receive antennas. The data streams may be received from Fast Fourier Transform (FFT) blocks, directly or indirectly. In FIG. 5, received data corresponds to HT-LTFs, where $h_{jn}^{(k)}$ is the $n^{th}$ HT-LTF signal in the $k^{th}$ tone at the $j^{th}$ receive antenna. Thus, in a first time period, the QR decomposition processor 250 receives HT-LTF signals corresponding to twelve tones and two antennas. In a second time period, the QR decomposition processor 250 receives HT-LTF signals corresponding to the twelve tones and the third antenna. Each CORDIC engine 254 operates on HT-LTF data corresponding to a single tone. For example, the CORDIC engine 254(1) may operate on $h_{1n}^{(1)}$, $h_{2n}^{(1)}$, and $h_{3n}^{(1)}$, whereas the CORDIC engine 254(2) may operate on $h_{2n}^{(2)}$, $h_{2n}^{(2)}$, and $h_{3n}^{(2)}$.

Figure 6:
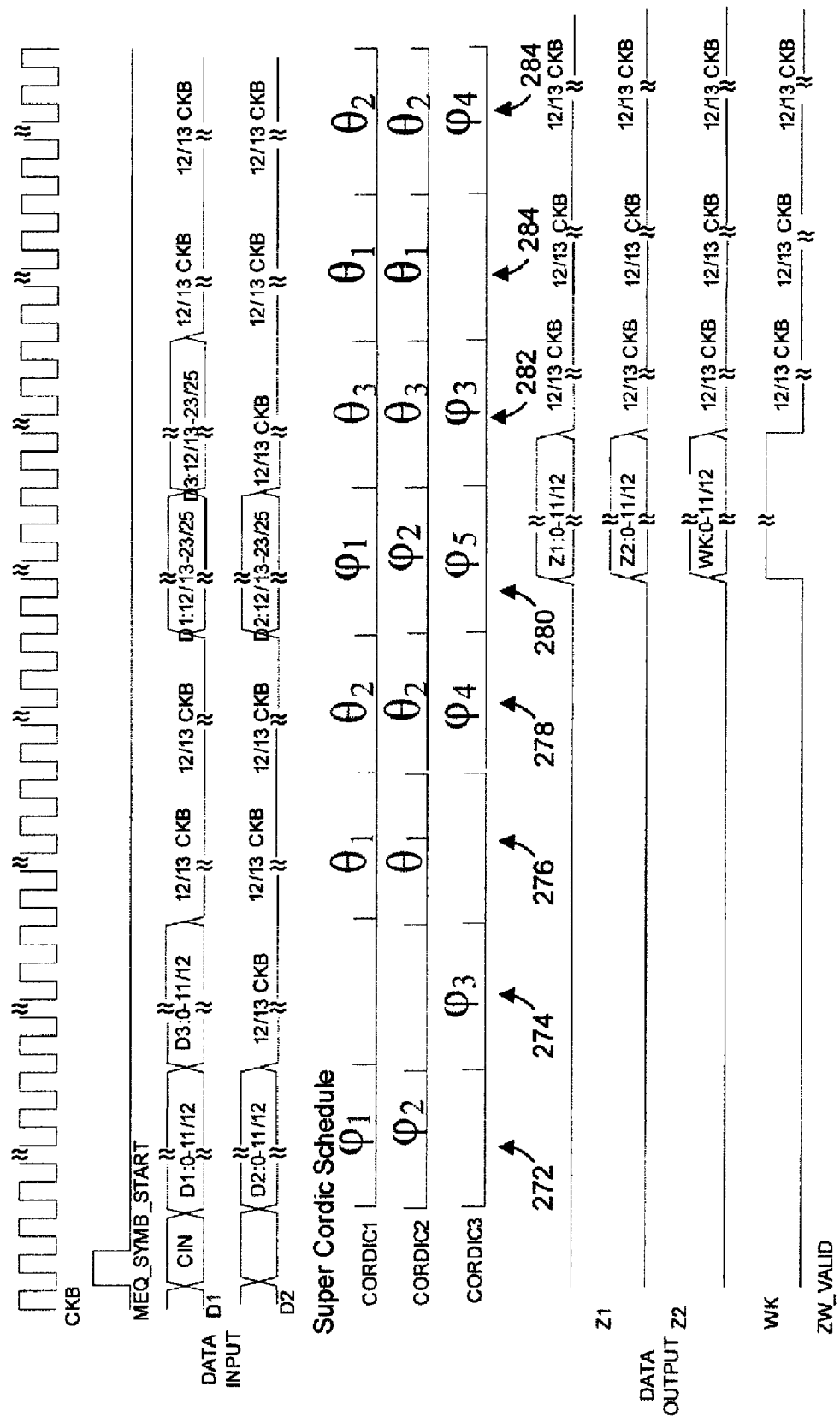
FIG. 6 is a timing diagram illustrating operation of the QR decomposition processor of FIG. 5.

FIG. 6 is a timing diagram corresponding to the QR decomposition processor 250. In a first time period 272, the QR decomposition processor 250 receives the n-th HT-LTF signals corresponding to twelve tones received by first and second antennas. During the time period 272, the CORDIC calculation blocks 266 may calculate the rotation angles $\phi_1$ for the first twelve tones based on the received data corresponding to the first antenna. Also, during the time period 272, the CORDIC calculation blocks 268 may calculate the rotation angles $\phi_2$ for the first twelve tones based on the received data corresponding to the second antenna.

During a time period 274, the QR decomposition processor 250 receives HT-LTF signals corresponding to the twelve tones received by the third antenna. During the time period 274, the CORDIC calculation blocks 270 may calculate the rotation angles $\phi_3$ for the first twelve tones based on the received data corresponding to the third antenna.

During a time period 276, the CORDIC calculation blocks 266 and the CORDIC calculation blocks 268 may calculate the rotation angles $\theta_1$ for the first twelve tones. During a time period 278, the CORDIC calculation blocks 266 and the CORDIC calculation blocks 268 may calculate the rotation angles $\theta_2$ for the first twelve tones. Also during the time period 278, the CORDIC calculation blocks 270 may calculate the rotation angles $\phi_4$ for the first twelve tones.

During a time period 280, the QR decomposition processor 250 receives HT-LTF signals corresponding to the next twelve tones received by first and second antennas. During the time period 280, the CORDIC calculation blocks 266 may calculate the rotation angles $\phi_1$ for the next twelve tones. Also, during the time period 280, the CORDIC calculation blocks 268 may calculate the rotation angles $\phi_2$ for the next twelve tones. Further during the time period 280, the CORDIC calculation blocks 270 may calculate the rotation angles $\phi_5$ for the first twelve tones.

During a time period 282, the QR decomposition processor 250 receives HT-LTF signals corresponding to the next twelve tones received by the third antenna. During the time period 282, the CORDIC calculation blocks 266 and the CORDIC calculation blocks 268 may calculate the rotation angles $\theta_3$ for the first twelve tones. Also during the time period 282, the CORDIC calculation blocks 270 may calculate the rotation angles $\phi_3$ for the next twelve tones.

During a time period 284, the CORDIC calculation blocks 266 and the CORDIC calculation blocks 268 may calculate the rotation angles $\theta_1$ for the next twelve tones. During a time period 286, the CORDIC calculation blocks 266 and the CORDIC calculation blocks 268 may calculate the rotation angles $\phi_2$ for the second twelve tones. Also during the time period 286, the CORDIC calculation blocks 270 may calculate the rotation angles $\phi_4$ for the second twelve tones. Accordingly, it can be seen that from time periods 280, 282, 284, 286 that the CORDIC calculation blocks are used to calculate the rotation angles for subsequent data symbols, but that some time periods (slots) may remain unused.

If a 20 MHz mode is to be supported and if the QR decomposition processor 250 includes twelve physical or virtual CORDIC blocks 254, the scheduling of FIG. 6 may be modified by, for example, providing HT-LTF signals corresponding to twelve tones during the time periods 272, 274, 280 and 282 at 4 blocks for 12 tones (48 tones total). Based on this CORDIC scheduling, the CORDIC equalization latency is 240 cycles (4×12×4+48). If the CORDIC clock is 160 MHz, there is a 1.5 microsecond latency delay. In another example, for 52 tones and 13 physical or virtual CORDIC blocks, angle rotations may be calculated for twelve tones during a time period of 4 blocks of 12 tones. Based on this CORDIC scheduling, the CORDIC equalization latency is 260 cycles (4×13×4+52). If the CORDIC clock is 160 MHz, there is a 1.625 microsecond latency delay. If a 40 MHz mode is to be supported and if the QR decomposition processor 250 includes thirteen physical or virtual CORDIC blocks 254, the scheduling of FIG. 6 may be modified by, for example, providing HT-LTF signals corresponding to thirteen tones during the time periods 272, 274, 280 and 282. Similarly, angle rotations may be calculated for thirteen tones during a time period.

As indicated above, the computation of the equalization matrix, W, may be initially computed using the MEQ block 122. More particularly, the equalization matrix W may be computed using free time periods or empty slots in the CORDIC engines. FIGS. 7-10 are timing diagrams illustrating one example schedule for using a matrix equalization block for equalization matrix calculations. As shown above, any matrix may be decompose using QR decomposition, including the channel matrix estimation, Ĥ. In other words, the channel matrix estimation, Ĥ, may be decomposed into an orthogonal Q matrix, and into an upper right triangular matrix, R. As also indicated above, the equalization matrix, W, is based on an inverse of the channel matrix, $H^{-1}$, which, for initialization purposes, may be approximated as the inverse of the channel matrix estimation, $\hat{H}^{-1}$.

Inverting the channel matrix estimation, Ĥ, to derive the equalization matrix, W, is generally more efficient using QR decomposition, because only the upper triangular matrix, R, needs to be inverted and the Q matrix may be conjugate transposed, and further because the transceiver performing the computation of the equalization matrix already knows the channel matrix estimation from the HT-LTFs. Accordingly, the equalization matrix, W, may be expressed as:

$$W = R^{-1} Q^* \quad \text{(Equ. 3)}$$

where $R^{-1}$ is the inverse of the upper right triangular matrix, R, from the QR decomposition of Ĥ, and Q* is the conjugate transpose (which may also be signified by the Hermitian operator, $Q^H$) of the Q orthogonal matrix from the QR decomposition of Ĥ. From one or more of the CORDIC engines 254, the conjugate transpose of the Q matrix, Q*, may be decomposed and expressed as a series of CORDIC angles, where each CORDIC angle represents a rotation matrix. As indicated above, the angles corresponding to the rotational matrices may be stored in the Q memory, rather than the rotational matrix. Accordingly, it should be understood that reference to the angles and the rotational matrices may be used interchangeably, without departing from the overall meaning of the disclosure.

The equation for the equalization matrix, W, for a 2×3 channel matrix, H, may be expressed as:

$$W = R^{-1}Q^* = R^{-1}Q_{\theta_3}Q_{\phi_5}Q_{\phi_4}Q_{\theta_2}Q_{\theta_1}Q_{\phi_3}Q_{\phi_2}Q_{\phi_1} \quad \text{(Equ. 4)}$$

where each of $Q_{\theta_3},Q_{\phi_5},Q_{\phi_4},Q_{\theta_2},Q_{\theta_1},Q_{\phi_3},Q_{\phi_2},Q_{\phi_1}$ represents a different CORDIC angle or rotation matrix. Accordingly, for the purposes of providing an initial equalization matrix towards the beginning of the transmission and which may be subsequently updated as described with respect to FIG. 2, the equalization matrix, W, may be computed by re-using the CORDIC engines, given that the equalization matrix may be expressed as a series of CORDIC angles. In particular, the CORDIC angles may be transformed into triangular matrices to be merged with the each other and with the inverse of the upper triangular matrix, $R^{-1}$, by performing rotations on the rotation matrices and inserting zeros into matrices. The merger of the CORDIC angles (or rather the triangular matrices thereof) and the inverse of the upper triangular matrix, $R^{-1}$, is performed in a series of steps as the CORDIC engines are available (i.e., unused). For each step, an interim value of W is computed and stored in the R memory of the MEQ block. The CORDIC angles are stored in the Q memory of the MEQ block. For purposes of computing the equalization matrix, the equalization matrix is initialized with the inverse upper triangular matrix, $R^{-1}$, which is subsequently overwritten in the R memory with the next interim value of W, which, in turn is overwritten with the subsequent interim value of W in the following step, as so on until each of the CORDIC angles have been merged together and with the inverse of the upper triangular matrix, $R^{-1}$. The entire computation may take place over the course of a few of the received data vectors or symbols. As will be seen below, an equalization matrix, $W_{n-1}$, is still provided for each received data vector, $y_n$, because the MEQ block 122 is still able to use the interim value of the equalization matrix as well as the CORDIC angles to compute $W_{n-1}$, but the MEQ update unit 130 generally uses only the final computed value of $W_{n-1}$, because it does not have its own CORDIC engines or QR processor. Again, the technique reuses existing hardware/software rather than adding additional hardware/software.

As seen from FIG. 6, there exist empty, unused slots or time periods in the CORDIC engines representative of times that the corresponding CORDIC engine is not in use. Referring to FIGS. 7-10, the timing diagrams show the availability of the CORDIC engines in the left half of the diagram, and show how the CORDIC engines may be reused in the right half of the timing diagrams. Generally, each timing diagram corresponds to a different step in computing the equalization matrix, W, each of which may occur when the MEQ block 122 operates on a data vector or data symbol.

Figure 7:
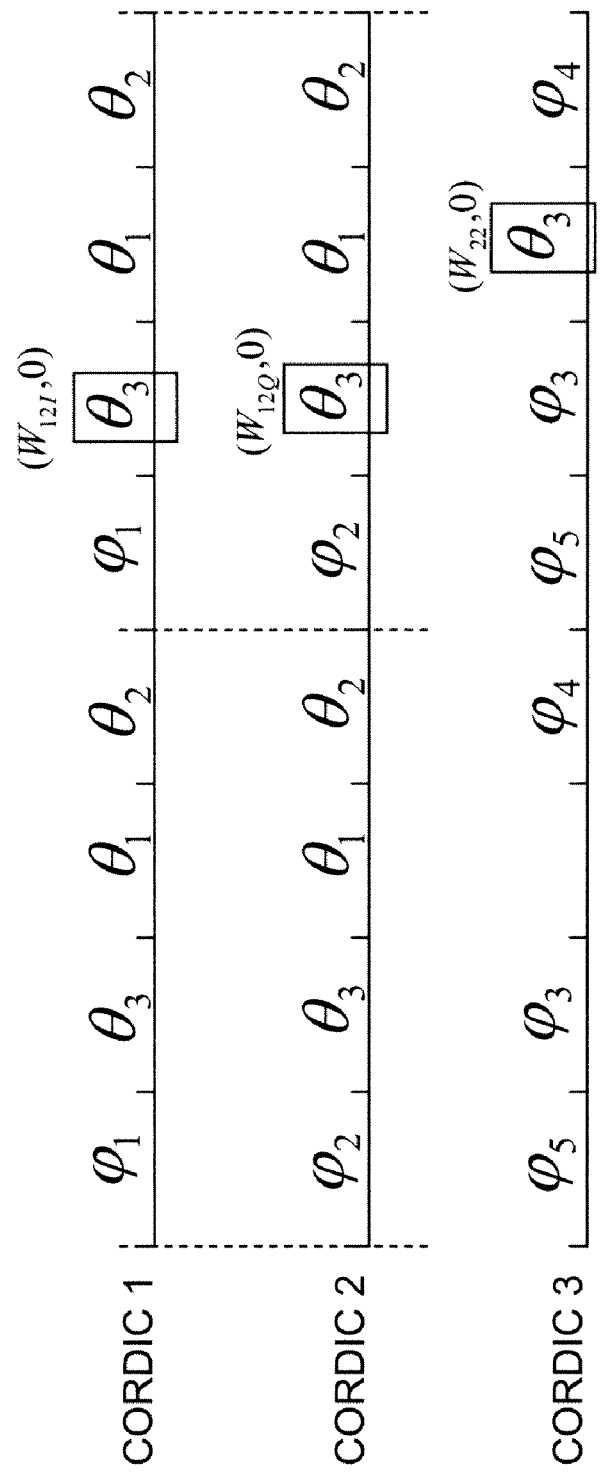
FIGS. 7-10 are a timing diagram illustrating one example schedule for reusing a matrix equalization block for equalization matrix calculations.

Referring specifically to FIG. 7, receipt of a first data symbol or data vector results in the CORDIC engines being used as shown on the left. The equalization matrix, W, (again, initialized to the inverse of the upper triangular matrix, $R^{-1}$) is read from the R memory and passed to the CORDIC engines. The CORDIC engines are reused as shown on the right where the CORDIC angle $\theta_3$ is merged with the inverse of the upper triangular matrix, $R^{-1}$, to generate the following entries of the interim or modified equalization matrix: $(W_{12I}, 0), (W_{12Q}, 0), (W^{22}, 0)$. The modified entries of the equalization matrix are written back to the R memory, overwriting $R^{-1}$. In this instance, because the operation involves the CORDIC angle $\theta_3$, the unused slot on the left may be used along with the two slots corresponding to the CORDIC angle $\theta_3$. At the same time, the MEQ block 122 outputs the equalized data vector, x̂, for the first data symbol or data vector, where the equalized data vector is expressed as:

$$\hat{x} = WQ_{\phi_5}Q_{\phi_4}Q_{\theta_2}Q_{\theta_1}Q_{\phi_3}Q_{\phi_2}Q_{\phi_1}y \quad \text{(Equ. 5)}$$

Figure 8:
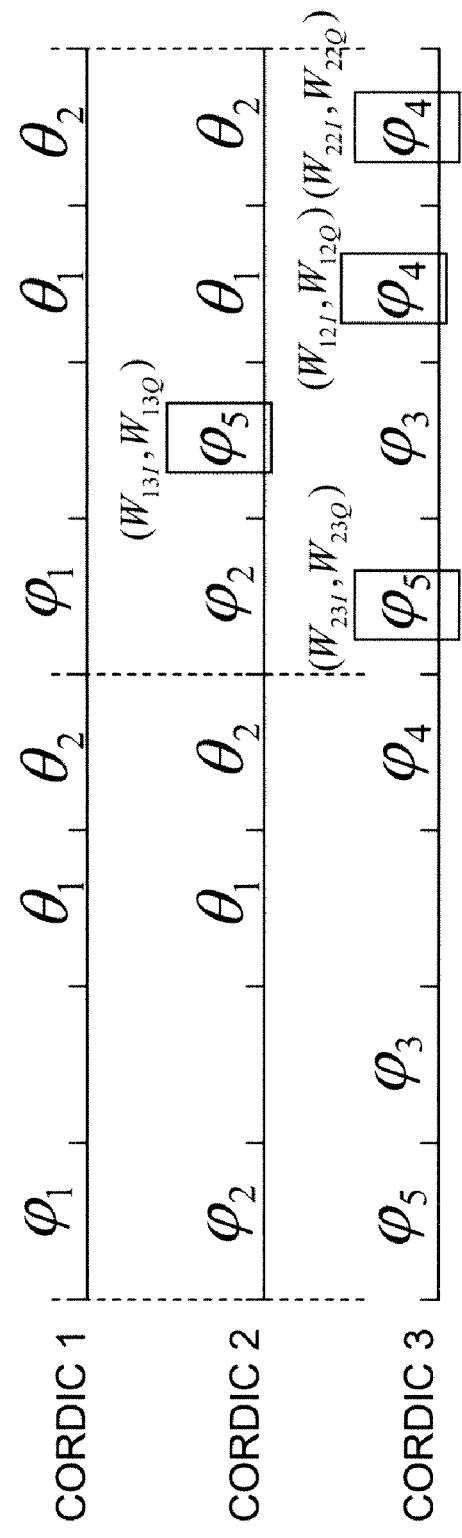

Referring specifically to FIG. 8, receipt of a second data symbol or data vector results in the CORDIC engines being used as shown on the left. The interim equalization matrix, W, (now modified) is read from the R memory and passed to the CORDIC engines. The CORDIC engines are reused as shown on the right where the CORDIC angles $\phi_5,\phi_4$ are merged with the interim equalization matrix W read from the R memory to generate the following entries of the next interim or modified equalization matrix: $(W_{13I}, W_{13Q}), (W_{23I}, W_{23Q}), (W_{22I}, W_{22Q}), (W_{12I}, W_{12Q})$. These modified entries of the equalization matrix are then written back to the R memory, overwriting the previously modified equalization matrix W. In this instance, because the operation involves the CORDIC angles $\phi_5,\phi_4$, the unused slots on the left may be used along with the two slots corresponding to the CORDIC angles $\phi_5,\phi_4$. At the same time, the MEQ block 122 outputs the equalized data vector, x̂, for the second data symbol or data vector, where the equalized data vector is expressed as:

$$\hat{x} = WQ_{\theta_2}Q_{\theta_1}Q_{\phi_3}Q_{\phi_2}Q_{\phi_1}y \quad \text{(Equ. 6)}$$

Figure 9:
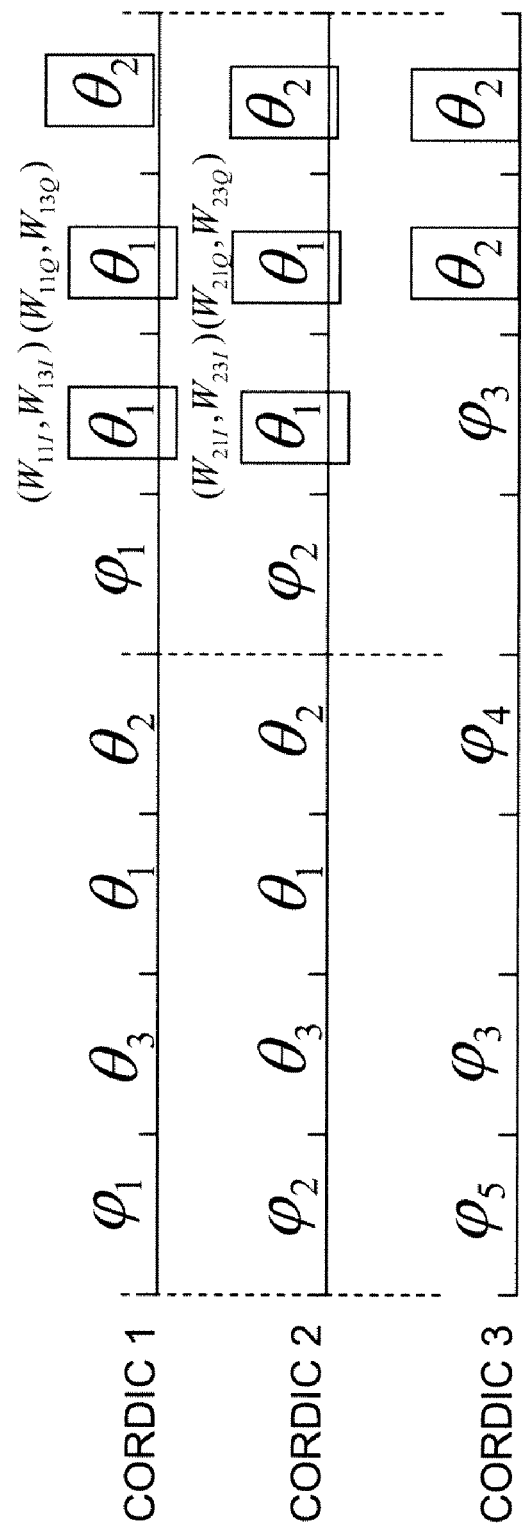

Referring to FIG. 9, receipt of a third data symbol or data vector results in the CORDIC engines being used as shown on the left. The interim equalization matrix, W, (now twice modified) is read from the R memory and passed to the CORDIC engines. The CORDIC engines are reused as shown on the right where the CORDIC angles $\theta_2,\theta_1$ are merged with the interim equalization matrix W read from the R memory to generate the following entries of the next interim or modified equalization matrix: $(W_{11I}, W_{13I}), (W_{11Q}, Q_{13Q}), (W_{21I}, W_{23I}), (W_{21Q}, W_{23Q})$, with zeros written for angle $\theta_2$. That is, the slots corresponding to angle $\theta_2$, are not used at that symbol number, because the slot corresponding to $\theta_2$ was last used in the previous symbol to compute $Q_{\theta_2}$ y, and the equalizer matrix has merged the effect of the rotation $\theta_2$, such that the rotation is subsequently omitted.

These modified entries of the equalization matrix are then written back to the R memory, overwriting the twice modified equalization matrix W. In this instance, because the operation involves the CORDIC angles $\theta_2,\theta_1$, the unused slots on the left may be used along with the two slots corresponding to the CORDIC angles $\theta_2,\theta_1$. Further, because some of the angles are already represented in the twice modified version of the equalization matrix used in the calculation of the equalized data vector, x̂, for the third data symbol or data vector (see equation below), those operations may be ignored and the corresponding slots used to merge the angles $\theta_2,\theta_1$ with the twice modified interim equalization matrix, W. At the same time, the MEQ block 122 outputs the equalized data vector, x̂, for the third data symbol or data vector, where the equalized data vector is expressed as:

$$\hat{x} = WQ_{\phi_3}Q_{\phi_2}Q_{\phi_1}y \quad \text{(Equ. 6)}$$

Figure 10:
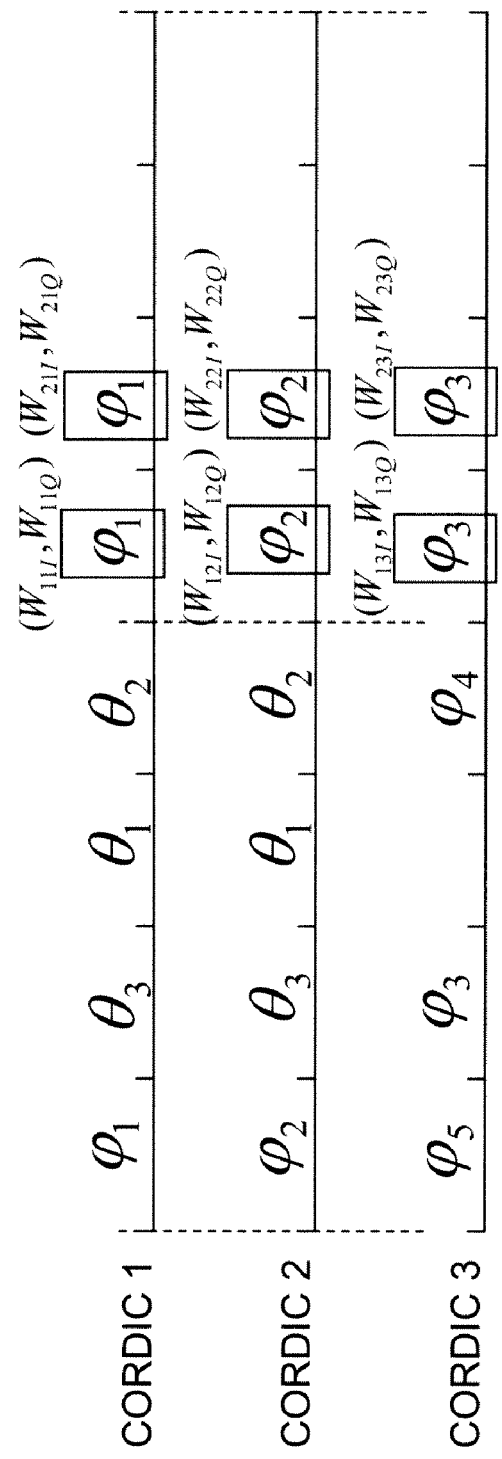

Referring to FIG. 10, receipt of a fourth data symbol or data vector results in the CORDIC engines being used as shown on the left. The interim equalization matrix, W, (now three times modified) is read from the R memory and passed to the CORDIC engines. The CORDIC engines are reused as shown on the right where the CORDIC angles $\phi_3, \phi_2, \phi_1$ are merged with the interim equalization matrix W read from the R memory to generate the following entries of the next interim or modified equalization matrix: ($W_{11I}$, $W_{11Q}$), ($W_{21I}$, $W_{21Q}$), ($W_{12I}$, $W_{12Q}$), ($W_{22I}$, $W_{22Q}$), ($W_{13I}$, $W_{13Q}$), ($W_{23I}$, $W_{23Q}$). At this point, all entries of the equalization matrix, W, have been determined and are written to the R memory, overwriting the three times modified equalization matrix W. In this instance, because the operation involves the CORDIC angles $\phi_3, \phi_2, \phi_1$, the unused slot on the left may be used along with the two slots corresponding to the CORDIC angles $\phi_3, \phi_2, \phi_1$. Further, because most of the angles are already represented in the three times modified version of the equalization matrix used in the calculation of the equalized data vector, $\hat{x}$, for the fourth data symbol or data vector (see equation below), those operations may be ignored and the corresponding slots used to merge the angles $\phi_3, \phi_2, \phi_1$ with the three times modified interim equalization matrix, W. At the same time, the MEQ block 122 outputs the equalized data vector, $\hat{x}$, for the fourth data symbol or data vector, where the equalized data vector is expressed as:

$$\hat{x} = Wy \quad \text{(Equ. 7)}$$

From the above, it can be understood that the MEQ block 122, and particularly the QR processor and CORDIC engines may be reused to compute the equalization matrix, W, within receipt of four data vectors or symbols in the data transmission. Now that the initial equalization matrix, W, is computed, the equalization matrix, W, may be applied to the next data vector or data symbol to generate an equalized vector, $\hat{x}_n$, of the data vector, $y_n$, or symbol, which is a representation of the transmitted data as affected by the channel matrix, H. The MEQ update unit 130 reads the representation of the transmitted data, $\hat{x}_n$, expressed as $W_{n-1}y_n$, from the memory 132 and compares the representation to the re-encoded data, $d_n$, for the data vector, $y_n$ to generate an error vector given by the equation:

$$e = d_n - W_{n-1}y_n \quad \text{(Equ. 8)}$$

As indicated above, the MEQ update unit 130 may generate an updated equalization matrix, $W_n$, using either an LMS adaptation rule or an RMS adaptation rule. Using the LMS adaptation rule, the updated equalization matrix is given as:

$$W_n = W_{n-1} + \mu e y_n^* \quad \text{(Equ. 9)}$$

As indicated above, the computational cost of the LMS adaptation rule is relative low. For example, for a 2×3 channel matrix, the computational cost is 24 multiplications.

Figure 11A:
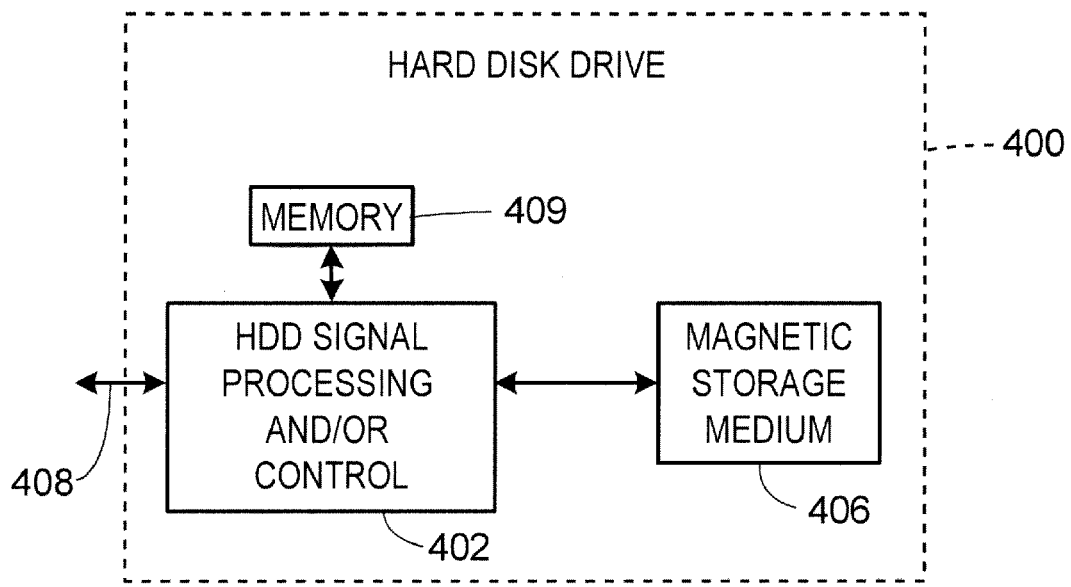
FIGS. 11A-11H illustrate examples of various different devices in which a wireless communication system implementing the antenna selection and training techniques described herein may be used.

Using the RMS adaptation rule, the updated equalization matrix is given as:

$$W_n = W_{n-1} + e g_n^T \quad \text{(Equ. 10)}$$

which accounts for 24 multiplications, where:

$$g_n = \frac{z_n}{1 + y_n^T z_n} \quad \text{(Equ. 11)}$$

which accounts for 18 multiplications, where:

$$z_n = P_{n-1}\bar{y}_n \quad \text{(Equ. 12)}$$

which accounts for 30 multiplications. The inverse of the autocorrelation matrix is updated as:

$$P_n = P_{n-1} - g_n z_n^* \quad \text{(Equ. 13)}$$

which accounts for 18 multiplications. As understood from the above, the total computational cost of the RMS adaptation rule is 90 multiplications, but as discussed above, RMS Referring to FIG. 11A, the antenna selection and training techniques may be used with a hard disk drive 400 which includes both signal processing and/or control circuits, which are generally identified in FIG. 11A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the antenna selection and training techniques described above. HDD 400 may be connected to memory 409, such as a random access memory (RAM), a low latency nonvolatile memory such as flash memory, read only memory (ROM) and/or other suitable electronic data storage.

Figure 11B:
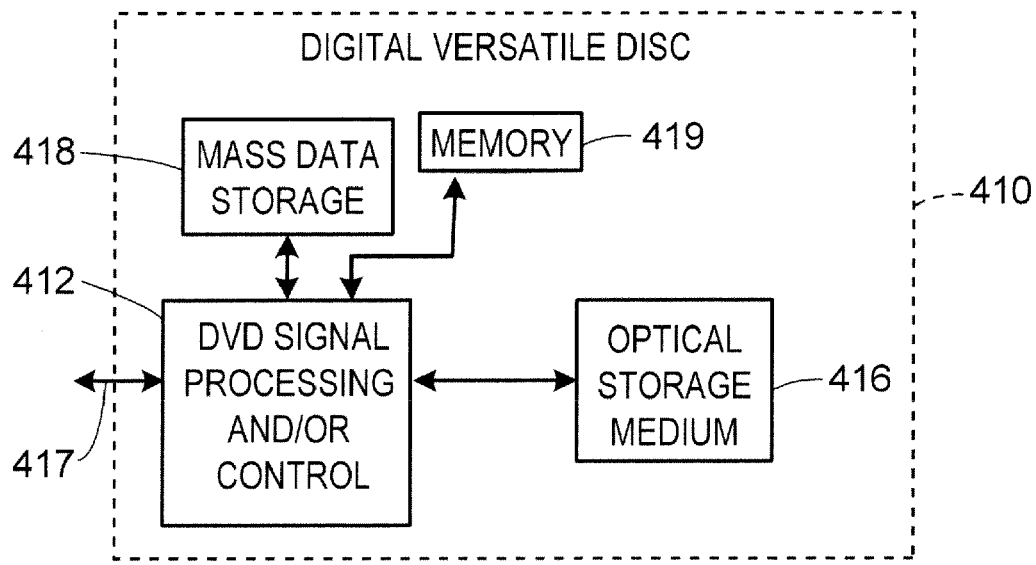

Referring now to FIG. 11B, the antenna selection and training techniques may be embodied in or used with a digital versatile disc (DVD) drive 410 which may include either or both signal processing and/or control circuits, which are generally identified in FIG. 11B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the antenna selection and training techniques described above. DVD 410 may communicate with mass data storage 418 that stores data in a nonvolatile manner. Mass data storage 418 may include a hard disk drive (HDD) such as that shown in FIG. 11A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

The matrix equalizer reuse techniques described above may be utilized in various MIMO devices, or any OFDM-based communication system that estimate channel gain. For example, matrix equalizer reuse for equalization matrix updating techniques such as described above may be utilized in base stations, access points, wireless routers, etc. Additionally, FIGS. 11A-11F illustrate various devices in which matrix equalizer reuse for beamsteering techniques such as described above, may be employed. Although the above has references many aspects of the IEEE Standard 802.11(x) communication standards, including 802.11n in particular, it should be understood that the matrix equalizer reuse techniques may also be applied to different wireless standards, including, but not limited to, WiMax, Digital Video Broadcasting—Terrestrial (DVB-T), Digital Audio Broadcasting (DAB), and Long Term Evolution (LTE).

Figure 11C:
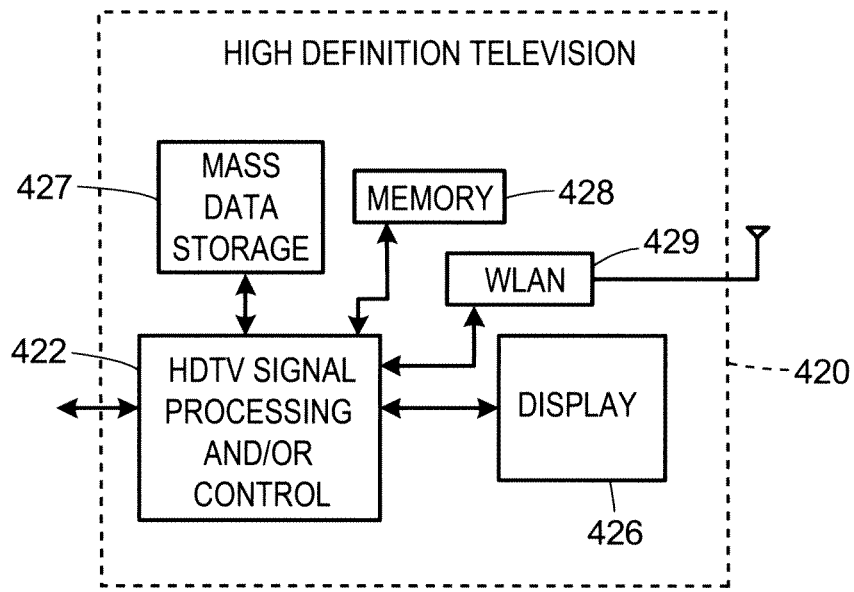

Referring now to FIG. 11C, the antenna selection and training techniques may be embodied in a high definition television (HDTV) 420 which may include either or both signal processing and/or control circuits, which are generally identified in FIG. 11C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 11A and/or at least one DVD may have the configuration shown in FIG. 11B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 11D:
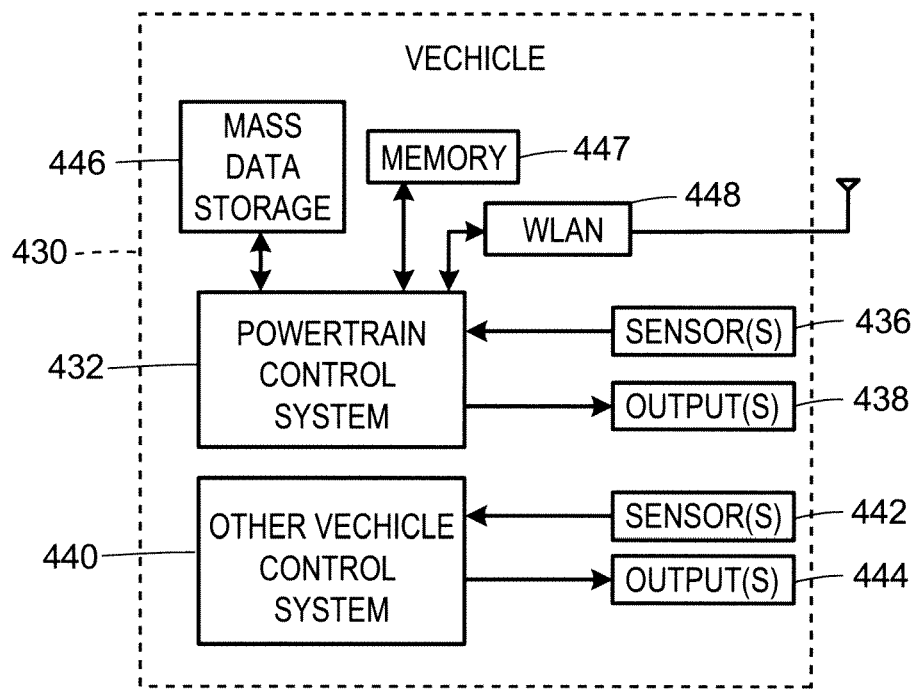

Referring now to FIG. 11D, the antenna selection and training techniques may be used in conjunction with a control system of a vehicle 430 having a WLAN interface and/or mass data storage. In some implementations, the antenna selection and training techniques may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The antenna selection and training techniques may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the antenna selection and training techniques described above. The control system 440 may also include mass data storage, memory and/or a WLAN interface (all not shown).

Figure 11E:
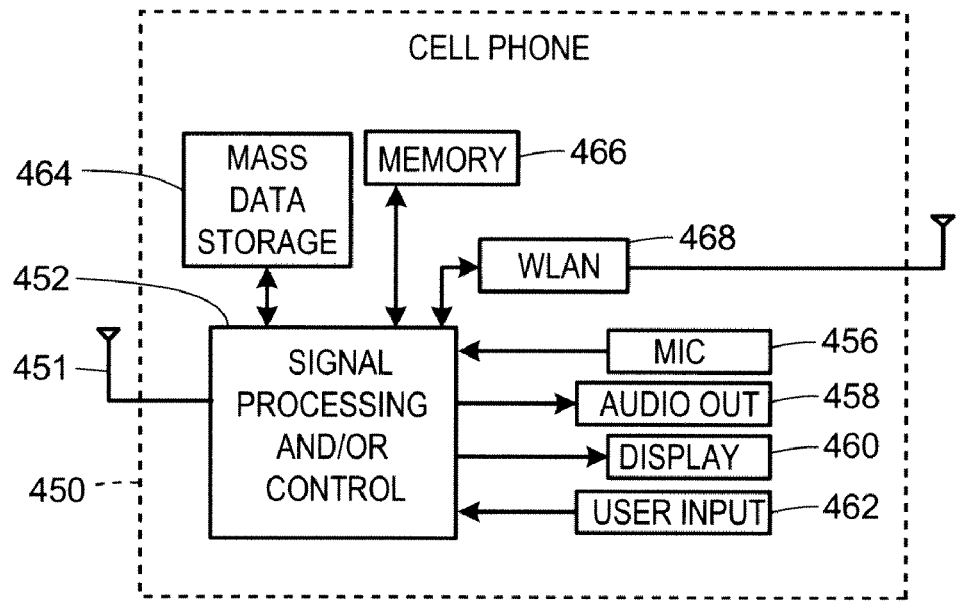

Referring now to FIG. 11E, the antenna selection and training techniques may be embodied in a cellular phone 450 that may include one or more cellular antennas 451, either or both signal processing and/or control circuits, which are generally identified in FIG. 11E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 11F:
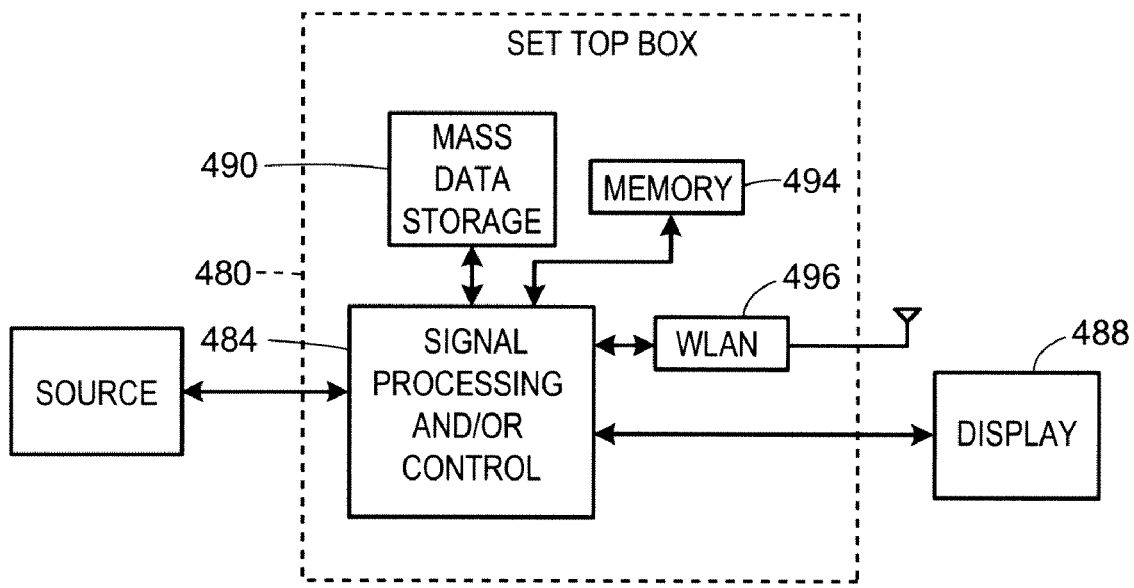

Referring now to FIG. 11F, the antenna selection and training techniques may be embodied in a set top box 480 including either or both signal processing and/or control circuits, which are generally identified in FIG. 11F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the antenna selection and training techniques described herein.

Figure 11G:
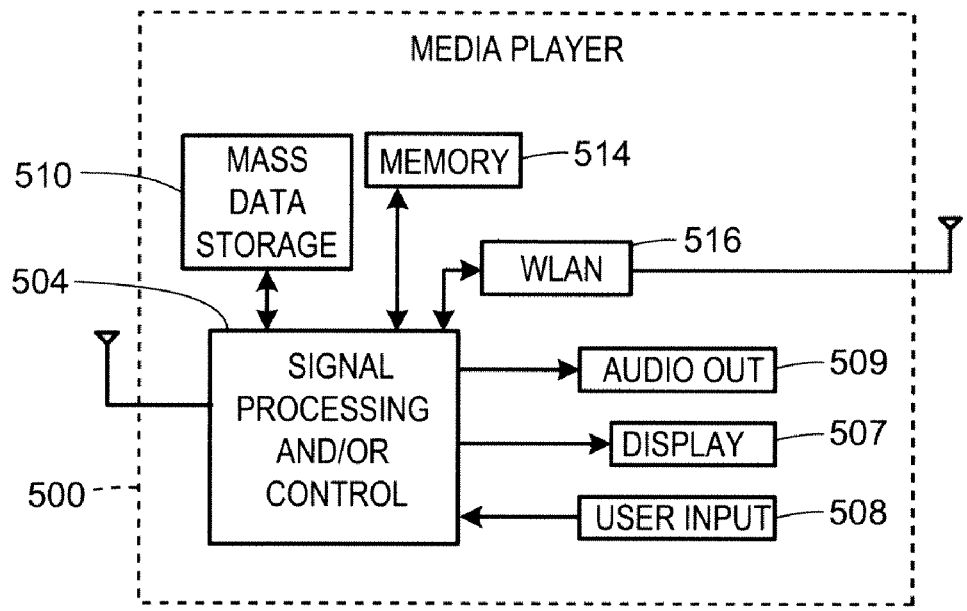

Referring now to FIG. 11G, the antenna selection and training techniques may be embodied in a media player 500. The antenna selection and training techniques may implement either or both signal processing and/or control circuits, which are generally identified in FIG. 11G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the antenna selection and training techniques described herein. Still other implementations in addition to those described above are contemplated.

Figure 11H:
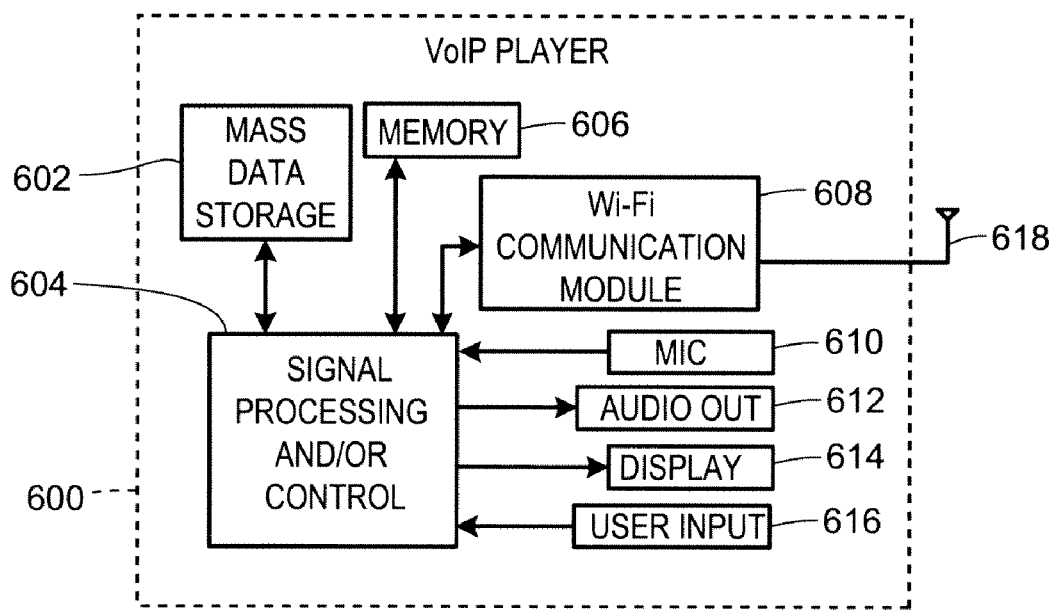

Referring to FIG. 11H, the antenna selection and training techniques may be embodied in a Voice over Internet Protocol (VoIP) phone 600 that may include one or more antennas 618, either or both signal processing and/or control circuits, which are generally identified in FIG. 11H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 11A and/or at least one DVD may have the configuration shown in FIG. 11B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the antenna selection and training techniques described herein.

Moreover, while the antenna selection and training techniques has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of channel tracking within a communication system having a first transceiver device having a plurality of transmission antennas and a second transceiver device having a plurality of receiving antennas, the method comprising:

computing an equalizer to be applied to signals received via at least one multiple input, multiple output (MIMO) channel using a matrix equalizer computational device when the matrix equalizer computational device is not needed for matrix equalization, wherein the equalizer is initialized to the inverse of a channel estimation matrix;

applying the equalizer to a received signal to recover an equalized representation of encoded data sent in a transmission from the first transceiver device to the second transceiver device;

removing errors from the equalized representation of the encoded data to generate an error-corrected estimation of the encoded data sent in the transmission;

comparing the equalized representation of the encoded data to the error-corrected estimation of the encoded data; and computing an updated equalizer to be applied to a subsequent signal.

2. The method of claim 1, wherein computing the equalizer to be applied to signals comprises computing the inverse of the channel estimation matrix using the matrix equalizer computational device in a plurality of steps wherein at each step a subset of the inverse of the channel estimation matrix is computed using the matrix equalization computational device.

3. The method of claim 2, wherein applying the equalizer to a received signal to recover an equalized representation of encoded data comprises applying any remaining subsets of the channel estimation matrix to the received signal and an output of the matrix equalization computational device generated from the subset of the inverse of the channel estimation matrix to the received signal following each step.

4. The method of claim 2, wherein the channel estimation matrix is generated by the matrix equalizer computation device as an orthogonal matrix and an upper triangular matrix, wherein the equalizer comprises an equalization matrix represented as the conjugate transpose of the orthogonal matrix and the inverse of the upper triangular matrix, and wherein computing the inverse of the channel estimation matrix using the matrix equalizer computational device in a plurality of steps comprises utilizing the conjugate transpose of the orthogonal matrix and the inverse of the upper triangular matrix in the matrix equalizer computational device to compute the inverse of the channel estimation matrix in a plurality of steps, wherein at each step a subset of the conjugate transpose of the orthogonal matrix is utilized by the matrix equalization computational device.

5. The method of claim 4, wherein the conjugate transpose of the orthogonal matrix comprises a plurality of rotation matrices, and wherein utilizing the conjugate transpose of the orthogonal matrix and the inverse of the upper triangular in to the matrix equalizer computational device to compute the inverse of the channel estimation matrix in a plurality of steps comprises utilizing a subset of the rotational matrices in the matrix equalizer computational device at each step.

6. The method of claim 5, wherein computing the equalizer to be applied to signals comprises merging the rotational matrices and the upper triangular matrix, wherein each step of computing the inverse of the channel estimation matrix comprises merging a subset of the rotational matrices and/or the upper triangular matrix.

7. The method of claim 2, wherein the matrix equalizer computation device applies an iterative QR decomposition to the channel estimation matrix to derive an orthogonal matrix and an upper triangular matrix; and wherein each step of computing the equalizer to be applied to signals comprises:

retrieving an equalization matrix from an R memory of the matrix equalization computation device, wherein the R memory is for storing data associated with an upper triangular matrix R resulting from the iterative QR decomposition;

retrieving a subset of the conjugate transpose of the orthogonal matrix from a Q memory of the matrix equalization computation device, wherein the Q memory is for storing data associated with an orthogonal matrix Q resulting from the iterative QR decomposition;

computing an interim equalization matrix from the retrieved equalization matrix and the retrieved subset of the conjugate transpose of the orthogonal matrix using the matrix equalizer computation device; and overwriting the equalization matrix in the R memory with the interim equalization matrix, wherein the first interim equalization matrix is initialized to the inverse of the upper triangular matrix and wherein the equalizer to be applied to signals is computed once each subset of the conjugate transpose of the orthogonal matrix has been retrieved from the Q memory.

8. The method of claim 2, wherein the received signal comprises a stream of one or more encoded symbols, wherein each step is performed upon receipt of a different one of the encoded symbols until the equalizer is computed, and wherein the equalized representation of the encoded data comprises an equalized vector generated based on an output of matrix equalizer computational device and based on any remaining subsets of the inverse of the channel estimation matrix.

9. The method of claim 1, wherein removing errors from the equalized representation of the encoded data comprises:

decoding the recovered representation of encoded data using a Viterbi decoder to remove errors from the representation of the encoded data; and re-encoding the decoded data to generate the estimation of the encoded data sent in the transmission.

10. The method of claim 1, wherein comparing the equalized representation of the encoded data to the error-corrected estimation of the encoded data comprises comparing the equalized representation of the encoded data to the error-corrected estimation of the encoded data to generate an error vector representing the difference between the equalized representation of the encoded data and the error-corrected estimation of the encoded data.

11. The method of claim 10, wherein computing an updated equalizer to be applied to a subsequent signal comprises computing an updated equalizer to be applied to a subsequent signal based on the equalizer and further based on the error vector.

12. The method of claim 11, wherein computing an updated equalizer to be applied to a subsequent signal based on the equalizer and further based on the error vector comprises computing the updated equalizer using one of the group consisting of: a least-mean-squares (LMS) adaptation rule and a recursive-least-squares (RLS) adaptation rule.

13. An apparatus, comprising:

a matrix equalizer comprising a matrix equalizer computational device, the matrix equalizer computation device computing an equalizer to be applied to signals received via at least one multiple input, multiple output (MIMO) channel when the matrix equalizer computational device is not needed for matrix equalization, wherein the equalizer is initialized to the inverse of a channel estimation matrix;

a decoder operatively coupled to an output of the matrix equalizer, the decoder to decode an equalized data vector from the matrix equalizer to remove errors from the equalized data vector;

an encoder operatively coupled to an output of the decoder to re-encode the error-corrected equalized data vector to generate an error corrected estimation of the data vector; and matrix equalizer update logic operatively coupled to an output of the encoder and to an output of the matrix equalizer, the matrix equalizer update logic to generate an update for an equalization matrix for the matrix equalizer.

14. The apparatus of claim 13, wherein the matrix equalizer comprises a QR decomposition processor, and wherein the matrix equalizer update is operatively coupled to the QR decomposition processor.

15. The apparatus of claim 14, wherein the QR decomposition processor comprises:

a Q memory;

an R memory; and one or more coordinate rotation digital calculation (CORDIC) engines each having a plurality of CORDIC calculators.

16. The apparatus of claim 15, wherein the matrix equalizer is configured to determine the equalization matrix in a plurality of steps using a stored equalization matrix from the R memory and CORDIC angles from the Q memory, wherein the equalization matrix is the inverse of a channel estimation matrix based on an upper triangular matrix R and an orthogonal matrix Q from the QR decomposition of a channel estimation matrix, and wherein the CORDIC angles represent a conjugate transpose of the orthogonal matrix Q.

17. The apparatus of claim 16, wherein the stored equalization matrix is initialized using the inverse of the upper triangular matrix and wherein the matrix equalizer is adapted to generate an interim equalization matrix at each step of determining the equalization matrix and overwrite the stored equalization matrix in the R memory with the interim equalization matrix.

18. The apparatus of claim 16, wherein the matrix equalizer is configured to merge the CORDIC angles and the inverse of the upper triangular matrix in the plurality of steps to determine the equalization matrix using the CORDIC engines when the CORDIC engines are not in use.

19. The apparatus of claim 13, wherein the matrix equalizer is configured to receive a plurality of encoded data symbols in a data transmission and determine an equalization matrix in a plurality of steps, each step corresponding to a successive data symbol, wherein the equalization matrix comprises the inverse of a channel estimation matrix.

20. The apparatus of claim 13, wherein the matrix equalizer applies an iterative QR decomposition to a channel estimate matrix; and wherein the matrix equalizer update logic is configured to retrieve an equalization matrix from an R memory of the matrix equalizer and retrieve rotational matrices from a Q memory of the matrix equalizer, wherein the R memory is for storing data associated with an upper triangular matrix R resulting from the iterative QR decomposition and the Q memory is for storing data associated with an orthogonal matrix Q from the iterative QR decomposition.

21. The apparatus of claim 20, wherein the matrix equalizer is configured to:

select the equalization matrix from the R memory;

select a subset of the rotational matrices from the Q memory;

merge the subset of rotational matrices with the equalization matrix;

wherein the merged rotational matrices and equalization matrix are stored in the R memory as a subsequent equalization matrix overriding the previously stored equalization matrix, and wherein the matrix equalizer update logic is configured to generate the update for an equalization matrix once the rotational matrices from the Q memory have been merged with the equalization matrix from the R memory.

22. The apparatus of claim 13, wherein the decoder comprises a Viterbi decoder.

23. The apparatus of claim 13, wherein the matrix equalizer is configured to apply the equalization matrix to a data vector received in a data transmission to generate the equalized vector.

24. The apparatus of claim 23, wherein the matrix equalizer update logic is configured to generate an error vector based on the equalized vector and the error corrected estimation of the data vector and generate the update for the equalization matrix from the error vector.

25. The apparatus of claim 24, wherein the matrix equalizer update logic is configured to generate the update for the equalization matrix using a least-mean-squares (LMS) adaptation rule.

26. The apparatus of claim 24, wherein the matrix equalizer update logic is configured to generate the update for the equalization matrix using a recursive-least-squares (RLS) adaptation rule.

27. A wireless transceiver for transmitting an information signal to a plurality of receiver antennas associated with one or more receivers and for receiving an information signal from a plurality of transmission antennas, the wireless transceiver comprising:

a plurality of antennas;

a QR decomposition processor having:
　a Q memory;
　an R memory;
　one or more coordinate rotation digital calculation (CORDIC) engines each having a plurality of CORDIC calculators, wherein the QR decomposition processor is configured to decompose an estimate of the channel into an orthogonal matrix Q and an upper triangular matrix R, matrix equalization logic to apply a matrix equalizer to a data vector received in a data packet to generate an equalized data vector, the matrix equalizer being based on a plurality of rotation angles representing the conjugate transpose of the orthogonal matrix Q and based on the inverse of the upper triangular matrix R, the matrix equalization logic configured to merge the rotation angles and the upper triangular matrix R in a plurality of steps to generate the matrix equalizer, each step being executed during an unused time period in one or more of the CORDIC engines;

a Viterbi decoder to decode the equalized data vector to remove errors from the equalized data vector;

an encoder to re-encode the error-corrected equalized data vector to generate an error corrected estimation of the data vector; and matrix equalizer update logic to generate an update to the matrix equalizer based on a difference between the error corrected estimation of the data vector and the equalized data vector.

* * * * *